(12) United States Patent
Astely et al.

(10) Patent No.: US 10,361,821 B2
(45) Date of Patent: Jul. 23, 2019

(54) SUB-SUBFRAME ASSIGNMENT AND HARQ TIMING

(71) Applicant: Telefonaktiebolaget LM Ericsson (publ), Stockholm (SE)

(72) Inventors: David Astely, Bromma (SE); Mattias Andersson, Stockholm (SE); Niklas Andgart, Södra Sandby (SE); Johan Bergman, Stockholm (SE); Helka-Liina Määttanen, Helsinki (FI); Stefan Parkvall, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 15/030,549

(22) PCT Filed: Mar. 9, 2016

(86) PCT No.: PCT/SE2016/050184
§ 371 (c)(1),
(2) Date: Apr. 19, 2016

(87) PCT Pub. No.: WO2016/144244
PCT Pub. Date: Sep. 15, 2016

(65) Prior Publication Data
US 2018/0198570 A1 Jul. 12, 2018

Related U.S. Application Data

(60) Provisional application No. 62/130,305, filed on Mar. 9, 2015.

(51) Int. Cl.
*H04L 27/00* (2006.01)
*H04W 88/08* (2009.01)
(Continued)

(52) U.S. Cl.
CPC .......... *H04L 1/1854* (2013.01); *H04L 1/1812* (2013.01); *H04L 1/1887* (2013.01);
(Continued)

(58) Field of Classification Search
CPC ... H04L 1/0016; H04L 1/0003; H04L 1/0026; H04L 27/0008; H04L 1/1854;
(Continued)

(56) References Cited

U.S. PATENT DOCUMENTS 9,762,357 B2* 9/2017 Maattanen ............ H04L 1/1671
2008/0080364 A1* 4/2008 Barak .................. H04B 7/0408
370/210

(Continued)

FOREIGN PATENT DOCUMENTS

EP       2249598 A1     11/2010
WO    2014110467 A1      7/2014
(Continued)

OTHER PUBLICATIONS

3GPP, "3rd Generation Partnership Project; Technical Specification Group Radio Access Network; Evolved Universal Terrestrial Radio Access (E-UTRA); Physical channels and modulation (Release 13)", 3GPP TS 36.211 V13.0.0, Dec. 2015, 1-141.
(Continued)

*Primary Examiner* — Edan Orgad
*Assistant Examiner* — Vanneilian Lalchinthang
(74) *Attorney, Agent, or Firm* — Sage Patent Group

(57) ABSTRACT

In one aspect, a wireless device receives a first data transmission from a base station during a predetermined subframe interval and within a duration that is less than a maximum data transmission duration that is possible within the predetermined subframe interval, and determines a transmission time for transmitting HARQ feedback to the base station such that the determined transmission time depends
(Continued)

on which subset of symbols within the predetermined subframe interval was used for the first data transmission. The wireless device transmits HARQ feedback for the first data transmission at the determined transmission time. In another aspect, a base station transmits the first data transmission and determines a reception time for receiving HARQ feedback such that the determined transmission time depends on which subset of symbols within the predetermined subframe interval was used. The base station receives HARQ feedback for the first data transmission at the determined transmission time.

24 Claims, 22 Drawing Sheets

(51) Int. Cl.
  *H04L 1/18* (2006.01)
  *H04L 5/00* (2006.01)
  *H04W 72/04* (2009.01)
  *H04W 72/08* (2009.01)
  *H04W 72/14* (2009.01)

(52) U.S. Cl.
  CPC .......... *H04L 1/1893* (2013.01); *H04L 1/1896* (2013.01); *H04L 5/0053* (2013.01); *H04W 72/0446* (2013.01); *H04W 72/085* (2013.01); *H04L 5/0044* (2013.01); *H04W 72/14* (2013.01)

(58) Field of Classification Search
  CPC ... H04L 1/1812; H04L 1/1887; H04L 5/0044; H04L 1/1893; H04L 1/1896; H04L 5/0053; H04W 72/042; H04W 72/14; H04W 72/0446; H04W 72/085; H04W 76/27; H04W 88/02; H04W 16/14
  USPC ........................................................ 370/336
  See application file for complete search history.

(56) References Cited

U.S. PATENT DOCUMENTS

| | | | | |
|---|---|---|---|---|
| 2012/0243515 A1* | 9/2012 | Xue | ..................... | H03M 13/23 |
| | | | | 370/336 |
| 2013/0044653 A1 | 2/2013 | Yang et al. | | |
| 2013/0058282 A1* | 3/2013 | Miki | ..................... | H04L 1/1854 |
| | | | | 370/328 |
| 2013/0343313 A1* | 12/2013 | Takeda | ..................... | H04L 5/001 |
| | | | | 370/329 |
| 2014/0301306 A1* | 10/2014 | Kim | ..................... | H04L 5/0046 |
| | | | | 370/329 |
| 2015/0358111 A1 | 12/2015 | Marinier et al. | | |
| 2016/0330763 A1* | 11/2016 | Marinier | ............... | H04W 88/06 |
| 2019/0021102 A1 | 1/2019 | Wang et al. | | |
| 2019/0044639 A1 | 2/2019 | Ouchi et al. | | |

FOREIGN PATENT DOCUMENTS

| | | | | |
|---|---|---|---|---|
| WO | WO-2014110467 A1 * | 7/2014 | .......... | H04L 1/0003 |
| WO | 2016040290 A1 | 3/2016 | | |

OTHER PUBLICATIONS

Dahlman, Erik et al., "4G LTE/LTE-Advanced for Mobile Broadband", Academic Press, Oxford, UK, 2011, 226-242.

Unknown, Author, "Study on Latency reduction techniques for LTE", Ericsson, RP-150310—Motivation for new proposed SI, Sep. 2014, 1-16.

Extended European Search Report for European Patent Application No. 18200405.1, dated Feb. 12, 2019, pp. 7.

Chakchai So-In et al: "Resource Allocation in IEEE 802.16 Mobile WiMAX", Apr. 30, 2010(Apr. 30, 2010), Retrieved from the Internet: URL:https://www.cse.wustl.edu/jain/books/ftp/wimax_ra.pdf [retrieved on Jan. 18, 2019].

Non-Final Office Action for U.S. Appl. No. 16/034,027, dated Feb. 19, 2019, 71 pages.

* cited by examiner

1800

RECEIVE A FIRST DATA TRANSMISSION FROM A SECOND WIRELESS DEVICE, WHERE THE FIRST DATA TRANSMISSION IS RECEIVED DURING A PREDETERMINED SUBFRAME INTERVAL, AND WHERE SAID RECEIVING COMPRISES DECODING FEWER THAN ALL OF A SCHEDULED NUMBER OF SYMBOLS IN THE FIRST DATA TRANSMISSION
1810

DETERMINE A TRANSMISSION TIME FOR TRANSMITTING HARQ FEEDBACK TO THE SECOND WIRELESS DEVICE, SUCH THAT THE DETERMINED TRANSMISSION TIME DEPENDS ON WHICH SUBSET OF SYMBOLS WITHIN THE PREDETERMINED SUBFRAME INTERVAL WAS USED IN SAID DECODING
1820

TRANSMIT HARQ FEEDBACK FOR THE FIRST DATA TRANSMISSION AT THE DETERMINED TRANSMISSION TIME
1830

*FIG. 18*

SUB-SUBFRAME ASSIGNMENT AND HARQ TIMING

TECHNICAL FIELD

The present application is generally related to wireless communications systems and is more specifically related to hybrid Automatic Repeat Request (HARQ) transmission in systems where data transmissions are scheduled for durations of less than a subframe.

BACKGROUND

For error control, the fourth-generation (4G) wireless system known as "Long-Term Evolution (LTE), standardized by members of the $3^{rd}$-Generation Partnership Project (3GPP), uses hybrid-ARQ (HARQ). After receiving downlink data in a subframe, the mobile terminal attempts to decode it and report, via a Physical Uplink Control Channel (PUCCH), to the base station whether (ACK) or not (NACK) the decoding was successful. In the event of an unsuccessful decoding attempt, the base station (eNodeB or eNB) can retransmit the erroneous data. Similarly, the base station can indicate to the mobile terminal whether the decoding of the Physical Uplink Shared Channel (PUSCH) was successful (ACK) or not (NACK) via the Physical Hybrid ARQ Indicator Channel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

Packet data latency is one of the performance metrics that vendors, operators and also end-users (via speed test applications) regularly measure. Latency measurements are done in all phases of a radio access network system lifetime, e.g., when verifying a new software release or system component, when deploying a system, and when the system is in commercial operation.

Improved latency compared to previous generations of 3GPP radio access technologies (RATs) was one performance metric that guided the design of LTE. LTE is also now recognized by its end users to be a system that provides faster access to internet and lower data latencies than previous generations of mobile radio technologies.

Packet data latency is important not only for the perceived responsiveness of the system, but is also a parameter that indirectly influences the throughput of the system. HTTP/TCP is the dominating application and transport layer protocol suite used on the Internet today. According to HTTP Archive (http://httparchive.org/trends.php), the typical size of HTTP based transactions over the Internet is in the range of a few tens of kilobytes up to 1 Mbyte. In this size range, the Transport Control Protocol (TCP) slow-start period is a significant part of the total transport period of the packet stream. During TCP slow start, the performance is latency limited. Hence, improved latency can rather easily be shown to improve the average throughput for this type of TCP based data transactions.

Radio resource efficiency can also be positively impacted by latency reductions. Lower packet data latency can increase the number of transmissions possible within a certain delay bound; hence, higher block-error rate (BLER) targets could be used for the data transmissions, freeing up radio resources and potentially improving the capacity of the system. It should also be noted that reduced latency of data transport may also indirectly give faster radio control plane procedures like call set-up/bearer set-up, due to the faster transport of higher layer control signaling.

There are several current applications that will be positively impacted by reduced latency, in terms of increased perceived quality of experience. Examples are gaming and real-time applications like Voice over LTE/Over-the-top voice over IP (VoLTE/OTT VoIP) and multi-party video conferencing. In the future, there will be a number of new applications that will be more delay critical. Examples may be remote control/driving of vehicles, augmented reality applications in, e.g., smart glasses, or specific machine communications requiring low latency.

LTE is a radio access technology based on radio access network control and scheduling. These facts impact the latency performance since a transmission of data need a round trip of lower layer control signaling. An example of this lower layer control signaling is shown in FIG. 1. The data is created by higher layers at T0. Then, the user equipment (UE) sends a scheduling request (SR) to the eNB to obtain resources for sending the data to the network. The eNB processes this SR and responds with a grant of uplink resources. After that, the data transfer can start, as shown at T6 in the figure.

When it comes to packet latency reductions, one area to address is the reduction of transport time of data and control signaling, e.g., by addressing the length of a transmit-time-interval (TTI), and the reduction of processing time of control signaling, e.g., by reducing the time it takes for a UE to process a grant signal.

SUMMARY

According to some embodiments, a wireless device determines a transmission time for transmitting ACK/NACK feedback in response to a received data transmission (e.g., a PDSCH transmission) in a given subframe, based on the duration of the data transmission within the subframe and/or based on the timing of the data transmission within the subframe. In the LTE context, a wireless terminal determines the timing for transmitting ACK/NACK feedback based on the specific set of OFDM symbols within the given downlink subframe that are used for the PDSCH and/or, equivalently, the transmission time and type of the control channel used to signal the resource assignment. In some embodiments, the first available uplink ACK/NACK transmission opportunity satisfying a particular delay with respect to the last OFDM symbol used for the PDSCH transmission is used for the ACK/NACK transmission, where the particular delay is based on the duration of the PDSCH transmission.

According to some embodiments, method, in a first wireless device, includes receiving a first data transmission from a second wireless device, where the first data transmission is received during a predetermined subframe interval and within a duration that is less than a maximum data transmission duration that is possible within the predetermined subframe interval. The method also includes determining a transmission time for transmitting HARQ feedback to the second wireless device, such that the determined transmission time depends on which subset of symbols within the predetermined subframe interval are used for the first data transmission. The method further includes transmitting HARQ feedback for the first data transmission at the determined transmission time. For example, the HARQ feedback may be transmitted by an LTE UE using a sub-subframe (SSF) allocation of resources that is less than a TTI of the subframe. This SSF allocation may be one of two slots in the subframe, such as shown in FIG. 2.

According to some embodiments, a method, in a first wireless device, includes transmitting a first data transmission to a second wireless device, where the first data transmission is transmitted during a predetermined subframe interval and within a duration that is less than a maximum data transmission duration that is possible within the predetermined subframe interval. The method also includes determining a reception time for receiving HARQ feedback from the second wireless device, such that the determined transmission time depends on which subset of symbols within the predetermined subframe interval was used for the first data transmission. The method further includes receiving HARQ feedback for the first data transmission at the determined transmission time.

According to some embodiments, a method, in a wireless device, includes receiving a first data transmission from a second wireless device, where the first data transmission is received during a predetermined subframe interval and within a duration that is less than a maximum data transmission duration that is possible within the predetermined subframe interval. The receiving includes decoding fewer than all of a scheduled number of symbols in the first data transmission. The method also includes determining a transmission time for transmitting HARQ feedback to the second wireless device, such that the determined transmission time depends on which subset of symbols within the predetermined subframe interval was used in said decoding. The method further includes transmitting HARQ feedback for the first data transmission at the determined transmission time. This wireless device may be an LTE UE.

According to some embodiments, a method, in a wireless device, includes transmitting a first data transmission to a second wireless device, where the first data transmission is transmitted during a predetermined subframe interval. The method further includes determining a reception time for receiving HARQ feedback from the second wireless device, such that the determined transmission time depends on which subset of symbols within the predetermined subframe interval was used by the second wireless device for decoding the first data transmission. Finally, the method includes receiving HARQ feedback for the first data transmission at the determined transmission time. The wireless device may be an LTE eNodeB.

According to some embodiments, a wireless device has a transceiver circuit and a processing circuit configured to perform either of these methods. Variations of the above-described methods, as well as corresponding apparatuses, computer program products, computer readable medium and functional implementations are described in detail below. Thus, the disclosed techniques are not limited to the above-summarized features and advantages. Indeed, those skilled in the art will recognize additional features and advantages upon reading the following detailed description, and upon viewing the accompanying drawings.

BRIEF DESCRIPTION OF THE DRAWINGS

FIG. 18 is a process flow diagram illustrating another method, according to some embodiments.

DETAILED DESCRIPTION

Figure 1:
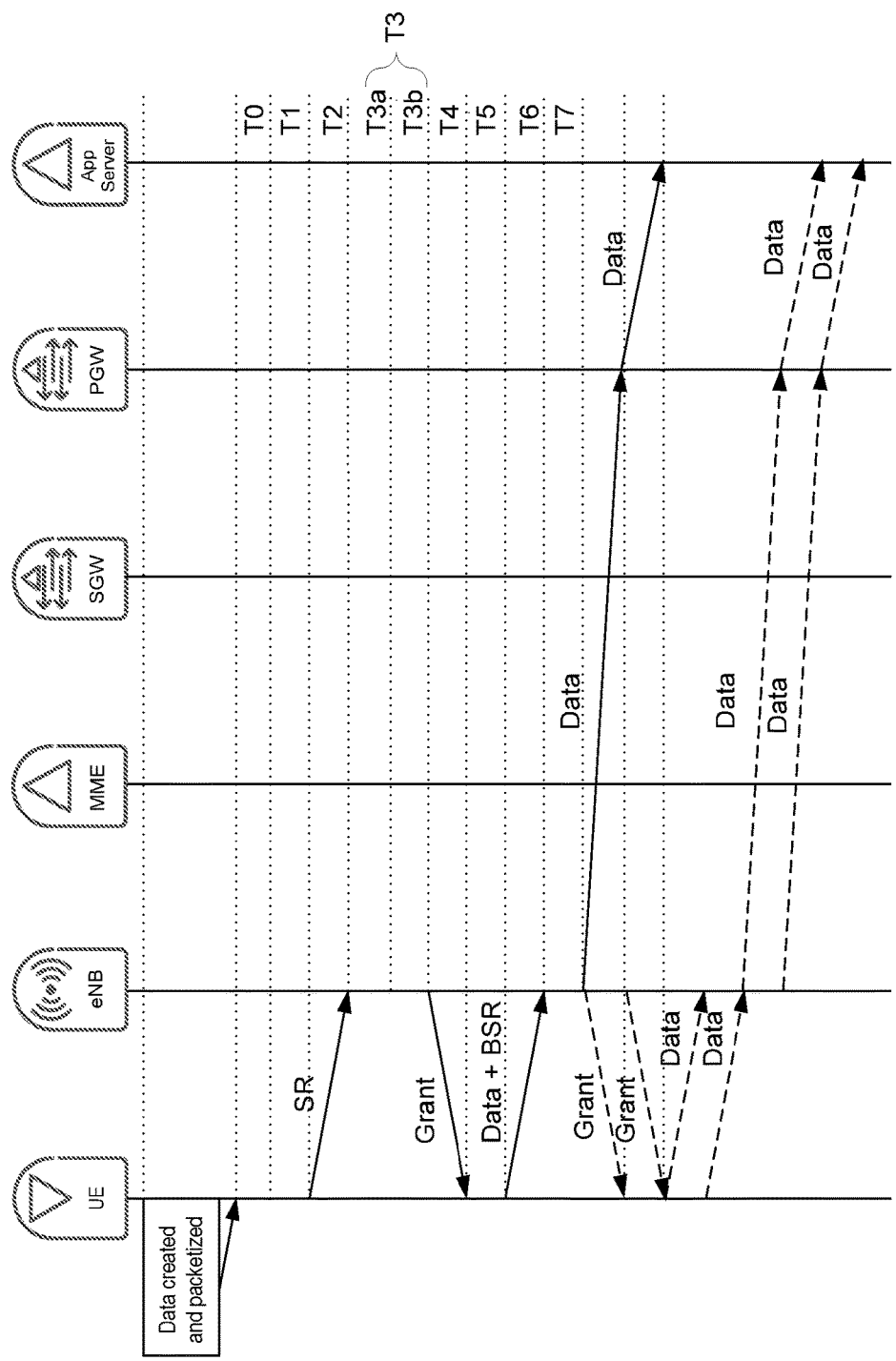
FIG. 1 illustrates an example of control signal timing for scheduling requests in an LTE system.

In a typical UE design, the UE receives an entire subframe before any processing of that subframe is started. For channel estimation purposes, there may be some look-ahead to obtain cell-specific reference symbols (CRS) from the following subframe, which will introduce a delay of one or a few symbols. Then, the demodulation of symbols in the received subframe and generation of soft values will take place, followed by turbo decoding. The time required for these operations is generally dependent on the size of the received transport block, and the processing chain of the UE is designed to allow for reception in the worst-case scenario, i.e., a scenario involving a maximum-size allocation and the most complex modulations and code rates, possibly on each of a number of aggregated component carriers. Further, the UE needs to complete processing on all of these blocks with an additional margin, as given by the maximum timing advance value. The timing advance is configured from the network to make the signals from different UEs arrive at the eNodeB at similar time instants—for large cell sizes, the timing advance may be specified to values up to 0.7 milliseconds, corresponding to the round-trip time of radio signals given a cell radius of about 100 kilometers.

One way to reduce the latency associated with decoding the data is to change the channel estimator and not employ any form of look ahead. The channel estimate is then available earlier, which allows demodulation and decoding to begin earlier. Similarly, since the time needed for turbo decoding depends on the code block size, latency can be further reduced by reducing the code block size. Hence, if the code block size (or equivalently the transport block size) is reduced, the decoding result will be available earlier (for a given decoding capability, in terms of number of parallel decoders). If instead of transmitting a single large code block of length 6000 bits once every millisecond, the system transmits two consecutives blocks of length 3000 bits every 0.5 milliseconds, the decoding latency for each block may be reduced by roughly one-half, while still sustaining the bit rate at roughly the same complexity. It should be noted that some performance degradations are expected from shorter block lengths and/or from eliminating look-aheads for channel estimation. In general, tradeoffs between latency and receiver performance can be expected. However, these tradeoffs need not necessarily diminish system or end user performance.

Given the discussion of receiver processing above, it follows that there is an opportunity to reduce the latency for terminal receiver processing by allowing for downlink transmissions, i.e., transmissions on the physical downlink shared channel (PDSCH), that are shorter than the current transmit-time interval (TTI) of one subframe in LTE systems, i.e., that occupy fewer than all of the orthogonal frequency-division multiplexing (OFDM) symbols allocated to the PDSCH in a subframe. In other words, the LTE system could be modified to not only allow PDSCH assignments covering all OFDM symbols in a 1 ms subframe, but also have PDSCH assignments with shorter durations, covering a lower number of consecutive OFDM symbols within a subframe. The duration of the assignment might vary from subframe to subframe.

Figure 2:
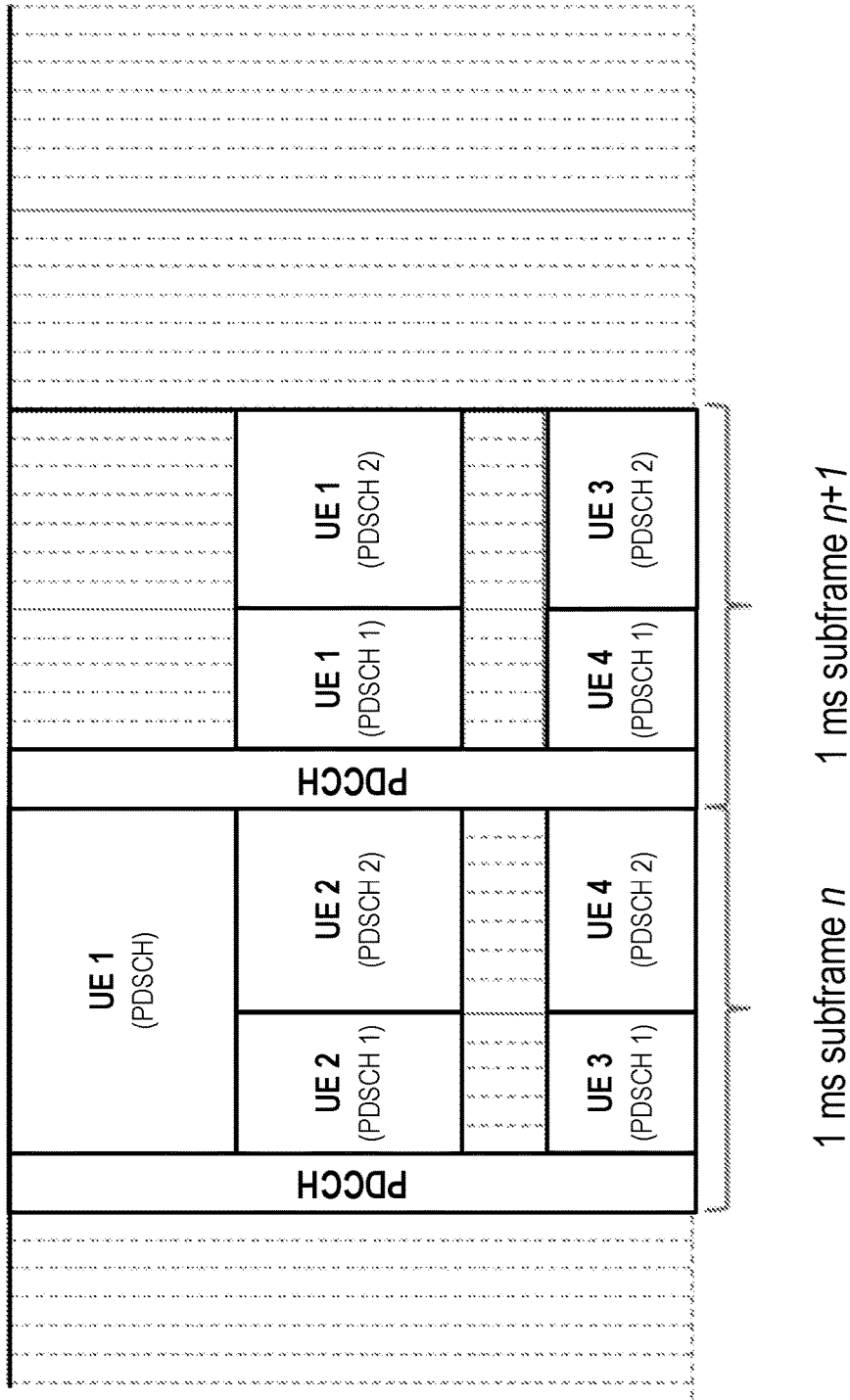
FIG. 2 illustrates examples of sub-subframe resource allocations in the downlink of an LTE system.

An example of this approach is illustrated in FIG. 2, where UE 1 has received a conventional (or "legacy") downlink grant in subframe n, such that it receives a single transport block that occupies all of the OFDM symbols allocated to PDSCH in the subframe, i.e., all of the OFDM symbols other than those reserved for the Physical Downlink Control Channel (PDCCH). UE 2, on the other hand, has received two distinct grants for subframe n—the first is received in the PDSCH symbols in the first slot of subframe n, while the other occupies the second slot. UE 3 and UE 4 each receive a downlink transmission in a single slot of subframe n. As seen in the figure, the downlink resource grants may change for the subsequent subframe, i.e., subframe n+1.

In future versions of the LTE standard, it is expected that terminals may have PDSCH assignments that, in the time domain, span a subset of the OFDM symbols in a subframe, rather than all of the OFDM symbols used for PDSCH (i.e., all symbols except symbols used by PDCCH and other good signals). Note that FIG. 2 does not show existing or future signals such as CRS, CSI reference signals (CSI-RS), and enhanced PDCCH (EPDCCH), meaning that all resource elements within the OFDM symbols used for resource assignments may not be available for data transmission.

There are several different ways in which such resource assignments, which might be referred to as "sub-subframe assignments", can be conveyed to the terminal. One way is via a PDCCH control message transmitted every one millisecond, using a modified version of the Downlink Control Information (DCI) message formats standardized by the 3GPP as of Release 11 of the specifications for LTE. Another is to use an entirely new form of PDCCH, also referred to as "short PDCCH" (SPDCCH), one or more of which may be transmitted within any given subframe.

For illustrative purposes, several embodiments will be described in the context of an LTE system. Those skilled in the art will appreciate, however, that several embodiments of the disclosed techniques may be more generally applicable to other wireless communication systems, including, for example, WiMax (IEEE 802.16) systems. Further, while the following description of certain embodiments of the invention will focus on downlink resource assignments and the corresponding HARQ transmissions in the uplink, it should be appreciated that the described techniques may be applied in the reverse direction, i.e., for uplink resource assignments and data transmissions and corresponding HARQ transmissions in the downlink. Likewise, the same techniques may be adapted for peer-to-peer transmissions, in some embodiments, where there is no "uplink" or "downlink" per se.

Figure 3:
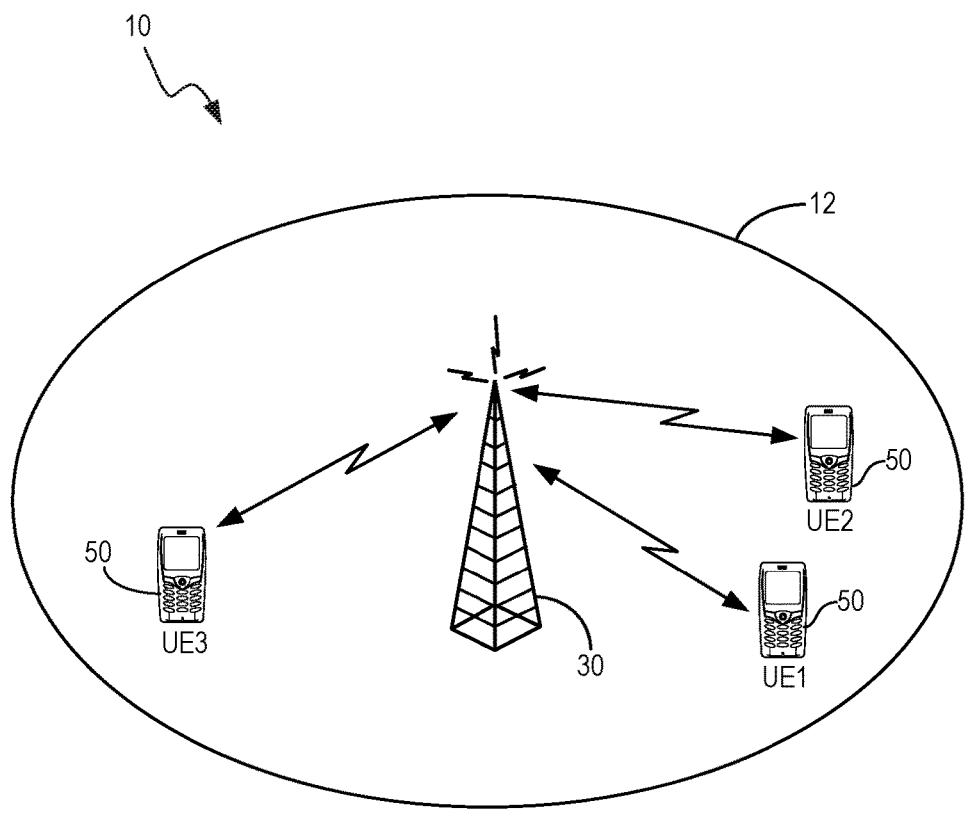
FIG. 3 illustrates an example of a mobile communication system.

FIG. 3 illustrates an exemplary mobile communication network 12 for providing wireless communication services to mobile terminals 50. Three mobile terminals 50, which are referred to as "user equipment" or "UE" in LTE terminology, are shown in FIG. 3. The mobile terminals 50 may comprise, for example, cellular telephones, personal digital assistants, smart phones, laptop computers, handheld computers, or other devices with wireless communication capabilities. It should be noted that the term "mobile terminal," as used herein, refers to a terminal operating in a mobile communication network and does not necessarily imply that the terminal itself is mobile or moveable. Thus, the term may refer to terminals that are installed in fixed configurations, such as in certain machine-to-machine applications, as well as to portable devices, devices installed in motor vehicles, etc.

The mobile communication network 10 comprises a plurality of geographic cell areas or sectors 12. Each geographic cell area or sector 12 is served by a base station 30, which is referred to in LTE as a NodeB or Evolved NodeB (eNodeB). One base station 30 may provide service in multiple geographic cell areas or sectors 12. The mobile terminals 50 receive signals from base station 30 on one or more downlink (DL) channels, and transmit signals to the base station 30 on one or more uplink (UL) channels.

Figure 4:
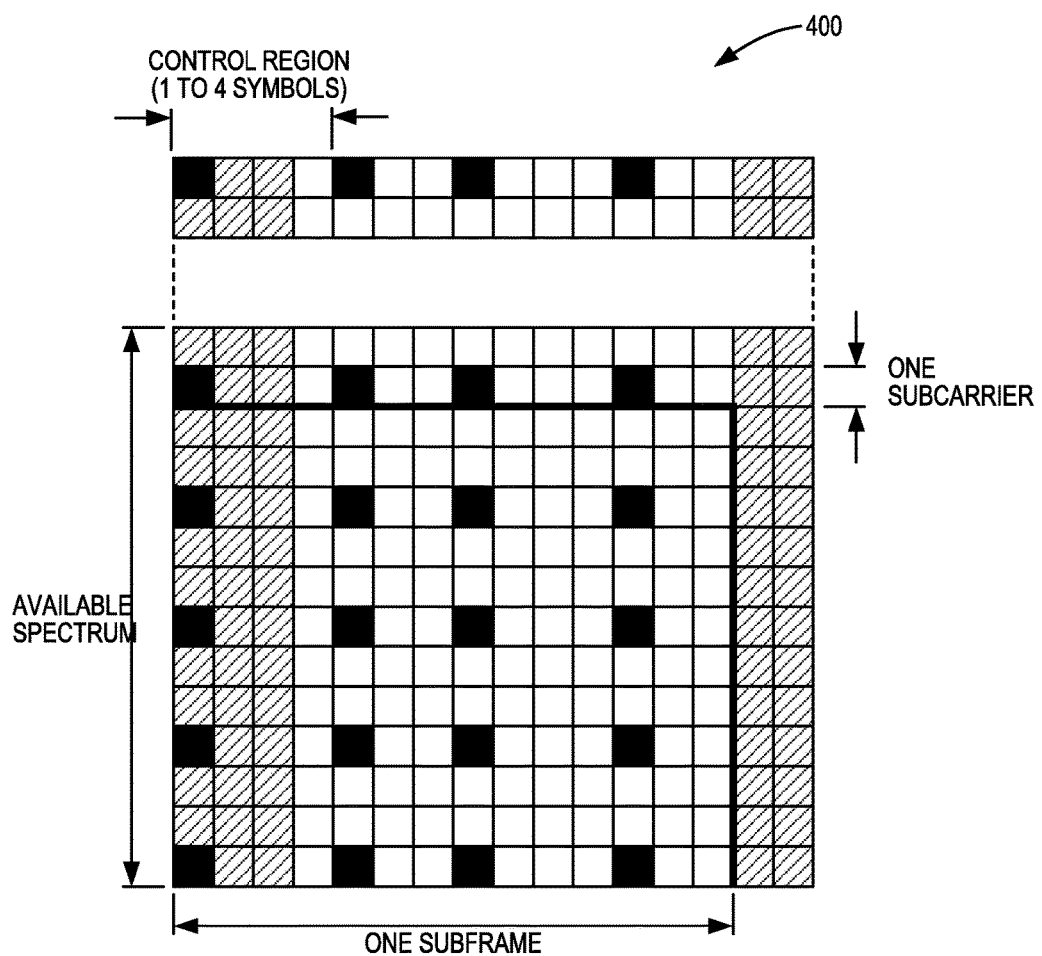
FIG. 4 illustrates a grid of time-frequency resources for a mobile communication system that uses OFDM.

LTE uses Orthogonal Frequency Division Multiplexing (OFDM) in the downlink and Discrete Fourier Transform (DFT)-spread OFDM in the uplink. The basic LTE downlink physical resource can be viewed as a time-frequency grid. FIG. 4 illustrates a portion of the available spectrum of an exemplary OFDM time-frequency grid 400 for LTE. Generally speaking, the time-frequency grid 400 is divided into one millisecond subframes. Each subframe includes a number of OFDM symbols. For a normal cyclic prefix (CP) length, suitable for use in situations where multipath dispersion is not expected to be extremely severe, a subframe consists of fourteen OFDM symbols. A subframe has only twelve OFDM symbols if an extended cyclic prefix is used. In the frequency domain, the physical resources are divided into adjacent subcarriers with a spacing of 15 kHz. The number of subcarriers varies according to the allocated system bandwidth. The smallest element of the time-frequency grid 400 is a resource element. A resource element consists of one OFDM subcarrier during one OFDM symbol interval.

Resource elements are grouped into resource blocks, where each resource block in turn consists of twelve OFDM subcarriers, within one of two equal-length slots of a subframe. FIG. 4 illustrates a resource block pair, comprising a total of 168 resource elements.

Downlink transmissions are dynamically scheduled, in that in each subframe the base station transmits control information identifying the mobile terminals to which data is transmitted and the resource blocks in which that data is transmitted, for the current downlink subframe. This control signaling is typically transmitted in a control region, which occupies the first one, two, three, or four OFDM symbols in each subframe. A downlink system with a control region of three 01-DM symbols is illustrated in FIG. 4. The dynamic scheduling information is communicated to the UEs via a Physical Downlink Control Channel (PDCCH) transmitted in the control region. After successful decoding of a PDCCH, the UE performs reception of traffic data from the Physical Downlink Shared Channel (PDSCH) or transmission of traffic data on the Physical Uplink Shared Channel (PUSCH), according to pre-determined timing specified in the LTE specifications.

Figure 5:
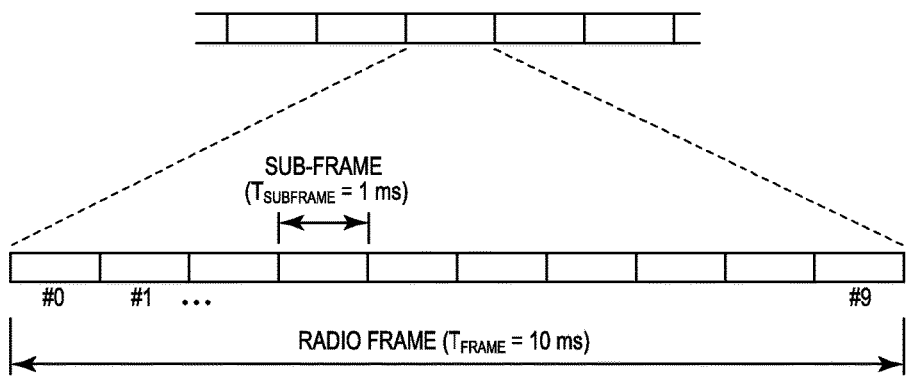
FIG. 5 illustrates the time-domain structure of an LTE signal.

As shown in FIG. 5, LTE downlink transmissions are further organized into radio frames of 10 milliseconds, in the time domain, each radio frame consisting of ten subframes. Each subframe can further be divided into two slots of 0.5 milliseconds duration. Furthermore, resource allocations in LTE are often described in terms of resource blocks, where a resource block corresponds to one slot (0.5 ms) in the time domain and twelve contiguous subcarriers in the frequency domain. Resource blocks are numbered in the frequency domain, starting with 0 from one end of the system bandwidth.

For error control, LTE uses HARQ, where, after receiving downlink data in a subframe, the mobile terminal attempts to decode it and reports to the base station whether the decoding was successful (ACK) or not (NACK) via a Physical Uplink Control Channel (PUCCH). In the event of an unsuccessful decoding attempt, the base station (eNodeB) can retransmit the erroneous data. Similarly, the base station can indicate to the UE whether the decoding of the PUSCH was successful (ACK) or not (NACK) via the Physical Hybrid ARQ Indicator Channel (PHICH).

In addition to the hybrid-ARQ ACK/NACK information transmitted from the mobile terminal to the base station, uplink control signaling from the mobile terminal to the base station also includes reports related to the downlink channel conditions, referred to generally as channel-state information (CSI) or channel-quality information (CQI). This CSI/CQI is used by the base station to assist in downlink resource scheduling decisions. Because LTE systems rely on dynamic scheduling of both downlink and uplink resources, uplink control-channel information also includes scheduling requests, which the mobile terminal sends to indicate that it needs uplink traffic-channel resources for uplink data transmissions.

In scenarios without downlink carrier aggregation, when a UE has data to transmit on PUSCH, it multiplexes the uplink control information with data on PUSCH. Thus, a UE only uses PUCCH for signaling this uplink control information when it does not have any data to transmit on PUSCH. Accordingly, if the mobile terminal has not been assigned an uplink resource for data transmission, Layer 1/Layer 2 (L1/L2) control information, including channel-status reports, hybrid-ARQ acknowledgments, and scheduling requests, is transmitted in uplink resources (resource blocks) specifically assigned for uplink L1/L2 control on the Physical Uplink Control Channel (PUCCH), which was first defined in Release 8 of the 3GPP specifications (LTE Rel-8).

Figure 6:
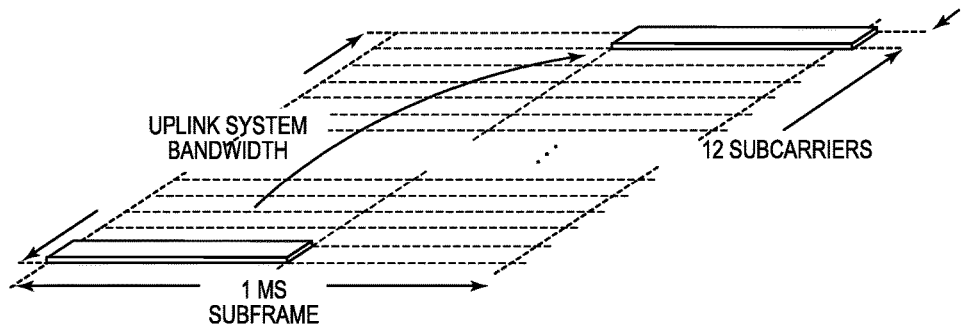
FIG. 6 illustrates the positioning of PUCCH resources in an uplink subframe according to Release 8 standards for LTE.

As illustrated in FIG. 6, these resources are located at the edges of the uplink cell bandwidth that is available to the mobile terminal for use. Each physical control channel resource is made up of a pair of resource blocks, where each resource block in turn consists of twelve OFDM subcarriers, within one of the two slots of the uplink subframe. In legacy LTE systems, in order to provide frequency diversity, the physical control channel resources are frequency hopped on the slot boundary—thus, the first resource block of the pair is at the lower part of the spectrum within the first slot of the subframe while the second resource block of the pair is positioned at the upper part of the spectrum during the second slot of the subframe (or vice-versa). If more resources are needed for the uplink L1/L2 control signaling, such as in case of very large overall transmission bandwidth supporting a large number of users, additional resource blocks can be assigned, adjacent to the previously assigned resource blocks.

The reasons for locating the PUCCH resources at the edges of the overall available spectrum are two-fold. First, together with the frequency hopping described above, this maximizes the frequency diversity experienced by the control signaling, which can be encoded so that it is spread across both resource blocks. Second, assigning uplink resources for the PUCCH at other positions within the spectrum, i.e., not at the edges, would fragment the uplink spectrum, making it difficult to assign very wide transmission bandwidths to a single mobile terminal while still retaining the single-carrier property of the uplink transmission.

When a UE has ACK/NACK to send in response to a downlink PDSCH transmission, it determines which PUCCH resource to use from the PDCCH transmission that assigned the PDSCH resources to the UE. More specifically, an index to the PUCCH resource for the UE is derived from the number of the first control channel element used to transmit the downlink resource assignment. When a UE has a scheduling request or CQI to send, it uses a specific PUCCH resource that has been pre-configured for the UE by higher layer signaling.

Depending on the different types of information that PUCCH is to carry, several different PUCCH formats may be used. The data-carrying capacity of a pair of resource blocks during one subframe is more than is generally needed for the short-term control signaling needs of one mobile terminal. Therefore, to efficiently exploit the resources set aside for control signaling, multiple mobile terminals can share the same physical control channel resource. This is done by assigning each of several mobile terminals different orthogonal phase-rotations of a cell-specific, length-12, frequency-domain sequence and/or different orthogonal time-domain cover codes. By applying these frequency-domain rotations and/or time-domain covering codes to the encoded control channel data, as many as 36 mobile terminals can share a given physical control channel resource, in some circumstances.

Several different encoding formats have been developed by 3GPP to encode different quantities and types of uplink control channel data, within the constraints of a single physical control channel resource. These several formats, known generally as PUCCH Format 1, PUCCH Format 2, and PUCCH Format 3, are described in detail at pages 226-242 of the text "4G LTE/LTE-Advanced for Mobile Broadband," by Erik Dahlman, Stefan Parkvall, and Johan Skold (Academic Press, Oxford UK, 2011), and are summarized briefly below.

PUCCH formats 1, 1a, and 1b, which are used to transmit scheduling requests and/or ACK/NACK, are based on cyclic shifts of a Zadoff-Chu sequence. A modulated data symbol is multiplied with the cyclically Zadoff-Chu shifted sequence. The cyclic shift varies from one symbol to another and from one slot to the next. Although twelve different shifts are available, higher-layer signaling may configure UEs in a given cell to use fewer than all of the shifts, to maintain orthogonality between PUCCH transmissions in cells that exhibit high frequency selectivity. After the modulated data symbol is multiplied with the Zadoff-Chu sequence, the result is spread using an orthogonal spreading sequence. PUCCH formats 1, 1a, and 1b carry three reference symbols per slot (when normal cyclic prefix is used), at SC-FDMA symbol numbers 2, 3, and 4.

PUCCH Formats 1a and 1b refer to PUCCH transmissions that carry either one or two hybrid-ARQ acknowledgements, respectively. A PUCCH Format 1 transmission (carrying only a SR) is transmitted on a UE-specific physical control channel resource (defined by a particular time-frequency resource, a cyclic-shift, and an orthogonal spreading code) that has been pre-configured by RRC signaling. Likewise, PUCCH Format 1a or 1b transmissions carrying only hybrid-ARQ acknowledgements are transmitted on a different UE-specific physical control channel resource. PUCCH Format 1a or 1b transmissions that are intended to carry both ACK/NACK information and a scheduling request are transmitted on the assigned SR resource for positive SR transmission, and are encoded with the ACK/NACK information.

Figure 7:
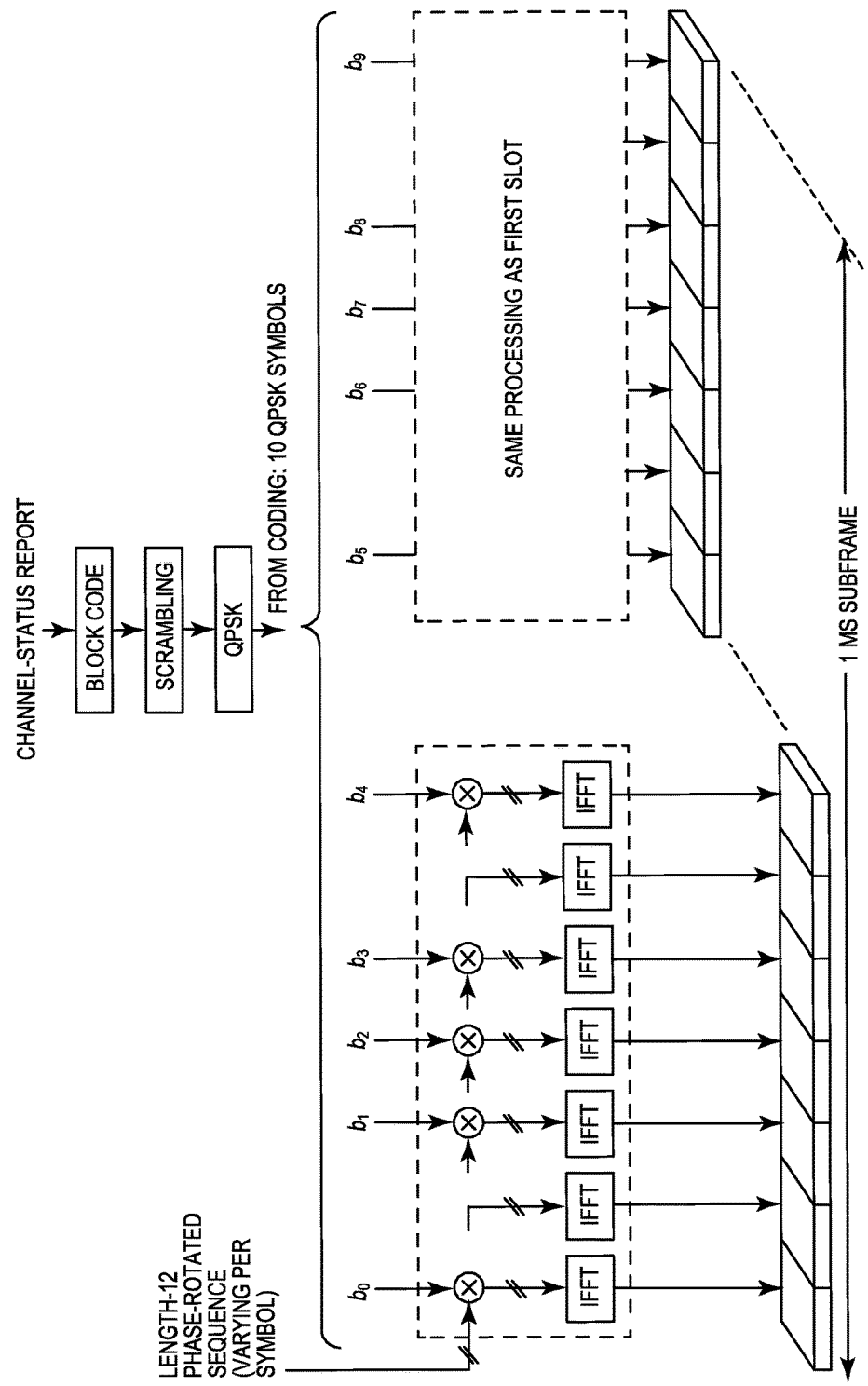
FIG. 7 illustrates the encoding and modulation of channel-status information according to PUCCH Format 2.

PUCCH Format 1/1a/1b transmissions carry only one or two bits of information (plus scheduling requests, depending on the physical control channel resource used for the transmission). Because channel-state information reports require more than two bits of data per subframe, PUCCH Format 2/2a/2b is used for these transmissions. As illustrated in FIG. 7, in PUCCH formats 2, 2a, and 2b, the channel-status reports are first block-coded, and then the block-coded bits for transmission are scrambled and QPSK modulated. (FIG. 7 illustrates coding for a subframe using a normal cyclic prefix, with seven symbols per slot. Slots using extended cyclic prefix have only one reference-signal symbol per slot, instead of two.) The resulting ten QPSK symbols are then multiplied with a cyclically shifted Zadoff-Chu type sequence, a length-12 phase-rotated sequence, where again the cyclic shift varies between symbols and slots. Five of the symbols are processed and transmitted in the first slot, i.e., the slot appearing on the left-hand side of FIG. 7, while the remaining five symbols are transmitted in the second slot. PUCCH formats 2, 2a, and 2b carry two reference symbols per slot, located on SC-FDMA symbol numbers 1 and 5.

For UEs operating in accordance with LTE Release 8 or LTE Release 9 (i.e., without carrier aggregation), it is possible to configure the UE in a mode where it reports ACK/NACK bits and CSI bits simultaneously. If the UE is using normal cyclic prefix, one or two ACK/NACK bits are modulated onto a QPSK symbol on the second reference signal (RS) resource element in each slot of the PUCCH format 2. If one ACK/NACK bit is modulated on the second RS in each slot, the PUCCH format used by the UE is referred to as PUCCH Format 2a. If two ACK/NACK bits are modulated on the second RS in each slot the PUCCH format used by the UE is referred to as PUCCH Format 2b.

If the UE is configured with extended cyclic prefix, one or two ACK/NACK bits are jointly coded with CSI feedback and transmitted together within PUCCH format 2.

As with PUCCH Format 1 transmissions, a pair of resource blocks allocated to PUCCH can carry multiple PUCCH Format 2 transmissions from several UEs, with the separate transmissions separated by the cyclic shifting. As with PUCCH Format 1, each unique PUCCH Format 2 resource can be represented by an index from which the phase rotation and other quantities necessary are derived. The PUCCH format 2 resources are semi-statically configured. It should be noted that a pair of resource blocks can either be configured to support a mix of PUCCH formats 2/2a/2b and 1/1a/1b, or to support formats 2/2a/2b exclusively.

3GPP's Release 10 of the LTE standards (LTE Release 10) has been published and provides support for bandwidths larger than 20 MHz, through the use of carrier aggregation. One important requirement placed on the development of LTE Release 10 specifications was to assure backwards compatibility with LTE Release 8. The need for spectrum compatibility dictated that an LTE Release 10 carrier that is wider than 20 MHz should appear as a number of distinct, smaller bandwidth, LTE carriers to an LTE Release 8 mobile terminal. Each of these distinct carriers can be referred to as a component carrier.

For early LTE Release 10 system deployments in particular, it can be expected that there will be a relatively small number of LTE Release 10-capable mobile terminals, compared to many "legacy" mobile terminals that conform to earlier releases of the LTE specifications. Therefore, it is necessary to ensure the efficient use of wide carriers for legacy mobile terminals as well as Release 10 mobile terminals, i.e., that it is possible to implement carriers where legacy mobile terminals can be scheduled in all parts of the wideband LTE Release 10 carrier.

One straightforward way to obtain this is by means of a technique called carrier aggregation. With carrier aggregation, an LTE Release 10 mobile terminal can receive multiple component carriers, where each component carrier has (or at least may have) the same structure as a Release 8 carrier. Release 10 of the LTE standards specifies support of up to five aggregated carriers, where each carrier is limited to one of six radio-frequency (RF) bandwidths, namely 1.4, 3, 5, 10, 15, and 20 MHz.

The number of aggregated component carriers as well as the bandwidth for each individual component carrier may be different for uplink and downlink. In a symmetric configuration, the number of component carriers in downlink and uplink is the same, whereas the numbers of uplink and downlink carriers differ in an asymmetric configuration.

During initial access, an LTE Release 10 mobile terminal behaves similarly to an LTE Release 8 mobile terminal, requesting and obtaining access to a single carrier for the uplink and downlink. Upon successful connection to the network a mobile terminal may—depending on its own capabilities and the network—be configured with additional component carriers in the uplink and downlink.

Even if a mobile terminal is configured with additional component carriers, it need not necessarily monitor all of them, all of the time. This is because LTE Release 10 supports activation of component carriers, as distinct from configuration. The mobile terminal monitors for PDCCH and PDSCH only component carriers that are both configured and activated. Since activation is based on Medium Access Control (MAC) control elements—which are faster than radio resource control (RRC) signaling—the activation/ de-activation process can dynamically follow the number of component carriers that is required to fulfill the current data rate needs. All but one component carrier—the downlink Primary component carrier (downlink PCC)—can be deactivated at any given time.

When carrier aggregation is used in LTE, one uplink carrier is designed to carry the HARQ-ACK/NACK bits for all downlink-carrier PDSCH transmissions. To enable the possibility to transmit more than four bits of A/N, PUCCH Format 3, which is defined in section 5.4.2A of 3GPP TS 36.211, can be used. In frequency-division duplex (FDD) scenarios, each downlink carrier can generate one or two HARQ ACK/NACK bits per scheduled subframe, depending on whether multiple-input multiple-output (MIMO) operation is enabled for that carrier. In time-division duplex (TDD) scenarios, the number of HARQ ACK/NACK bits also depends on how many downlink subframes a given uplink subframe should carry HARQ ACK/NACK bits for.

Figure 8:
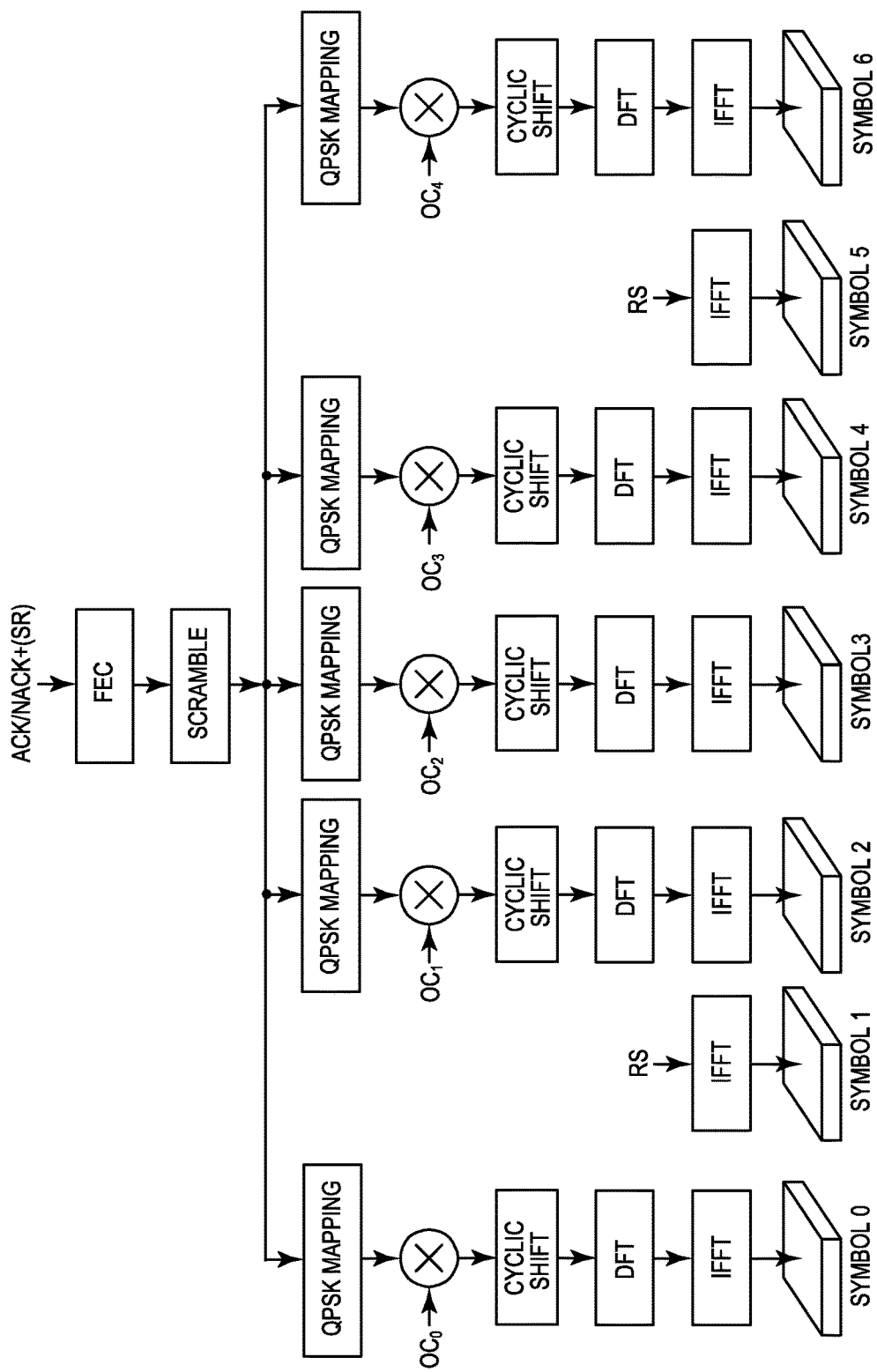
FIG. 8 illustrates the encoding and modulation of multiple ACK/NACK bits according to PUCCH Format 3.

PUCCH Format 3, which is designed for scenarios when more than four bits of information must be transmitted, is based on DFT-spread OFDM. FIG. 8 shows a block diagram of that design, for one of the two slots of an LTE subframe. The same processing is applied to the second slot of the uplink frame. In the illustrated scenario, multiple ACK/NACK bits (which may be combined with a single SR bit) are encoded, using a Reed-Muller (RM) forward-error correction (FEC) code, to form 48 coded bits. (Some of the 32 output-coded bits produced by the RM encoder are repeated to produce the 48 coded bits.) The coded bits are then scrambled, using cell-specific (and possibly DFT-spread OFDM symbol dependent) sequences. 24 bits are transmitted within the first slot and the other 24 bits are transmitted within the second slot. The 24 bits per slot are then mapped into 12 QPSK symbols, as indicated by the blocks labeled "QPSK mapping" in FIG. 8, which appear in five of the OFDM symbols of the slot (symbols 0, 2, 3, 4, and 6). The sequence of symbols in each of these five symbols in the slot is spread with OFDM-symbol-specific orthogonal cover codes, indicated by OC0, OC1, OC2, OC3, and OC4 in FIG. 8, and cyclically shifted, prior to DFT-precoding. he DFT-precoded symbols are converted to OFDM symbols (using an Inverse Fast-Fourier Transform, or IFFT) and transmitted within one resource block (the bandwidth resource) and five DFT-spread OFDM symbols (the time resource). The spreading sequence or orthogonal cover code (OC) is UE-specific and enables multiplexing of up to five users within the same resource blocks.

For the reference signals (RS), cyclic-shifted constant-amplitude zero-autocorrelation (CAZAC) sequences can be used. For example, the computer optimized sequences in 3GPP TS 36.211, "Physical Channels and Modulation," can be used. To improve orthogonality among reference signals even further, an orthogonal cover code of length two could be applied to the reference signals. However, this approach is not used in Releases 10 or 11 of the LTE specifications.

If the number of ACK/NACK bits exceeds eleven, then the bits are split into two parts and two RM encoders are used, one for each of the two parts. This is known as the dual-RM code. Up to twenty ACK/NACK bits (plus one SR bit) can be supported by PUCCH Format 3 in this manner. Each encoder in the dual-RM code outputs twenty-four bits which are converted to twelve QPSK symbols, and the resulting two sets of twelve QPSK symbols are distributed across the slots and interleaved over the subcarriers so that the twelve symbols from the first encoder are mapped to odd subcarriers and the twelve symbols from the second encoder are mapped to even subcarriers, where six odd and six even sub-carriers are assumed per slot. (In this mapping operation, a cell-, slot-, and symbol-specific cyclic shift of the symbols in the time domain is included, to provide inter-cell interference randomization.) The twelve QPSK symbols per slot are then spread across the five DFTS-OFDM symbols, using one out of five orthogonal cover codes, as in the single-RM code case.

Figure 9:
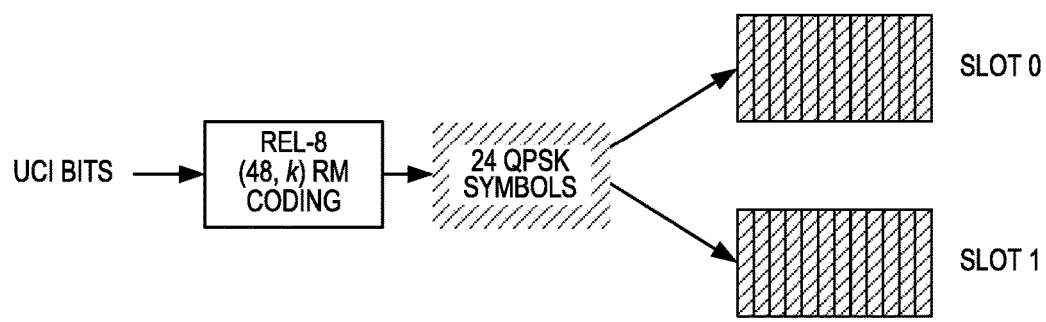
FIG. 9 illustrates PUCCH Format 3 encoding and multiplexing for up to 11 bits.
Figure 10:
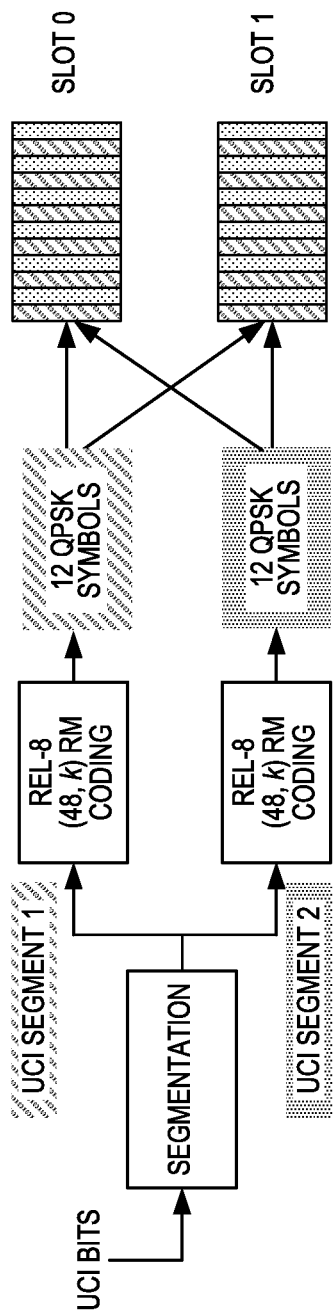
FIG. 10 illustrates details of PUCCH Format 3 encoding and multiplexing for 12-21 bits.

Some details of the encoding and multiplexing approach described above are shown in FIGS. 9 and 10. FIG. 9 illustrates the approach for up to eleven uplink control information (UCI) bits. As described above, in this case the UCI bits are encoded to produce 48 bits, using a single encoder. These 48 bits are mapped to 24 QPSK symbols, which are divided between the first and second slots of the uplink subframe carrying the PUCCH. FIG. 10, on the other hand, illustrates the approach taken for 12 to 21 UCI bits. In this case, the UCI bits are split into two segments, which are supplied to two separate encoders. Each encoder produces 24 encoded bits, which are mapped into twelve QPSK symbols. The 12 QPSK symbols from each encoder are distributed, on an interleaved basis, between the two slots of the uplink subframe.

The operation of the multiplexing scheme illustrated in FIG. 9 is described by the following algorithm, in which $\bar{b}_0, \bar{b}_1, \bar{b}_2, \ldots, \bar{b}_{23}$ is the output sequence from the first encoder and $\tilde{\bar{b}}_0, \tilde{\bar{b}}_1, \tilde{\bar{b}}_2, \ldots, \tilde{\bar{b}}_{23}$, the output sequence from the second encoder. $N_{sc}^{RB}=12$ is the number of subcarriers per resource block. The output bit sequence $\hat{b}_0, \hat{b}_1, \hat{b}_2, \ldots, \hat{b}_{B-1}$, where $B=4 \cdot N_{sc}^{RB}$, is obtained by the alternate concatenation of the bit sequences $\bar{b}_0, \bar{b}_1, \bar{b}_2, \ldots \bar{b}_{23}$ and $\tilde{\bar{b}}_0, \tilde{\bar{b}}_1, \tilde{\bar{b}}_2, \ldots \tilde{\bar{b}}_{23}$, as shown in the following pseudo-code:

```
Set i, j = 0
while i < 4 · N_sc^RB
    b_i = b̄_j , b_{i+1} = b̄_{j+1}
    b_{i+2} = b̃̄_{j+1}, b_{i+3} = b̃̄_{j-1}
    i = i + 4
    j = j + 2
end while.
```

Figure 11:
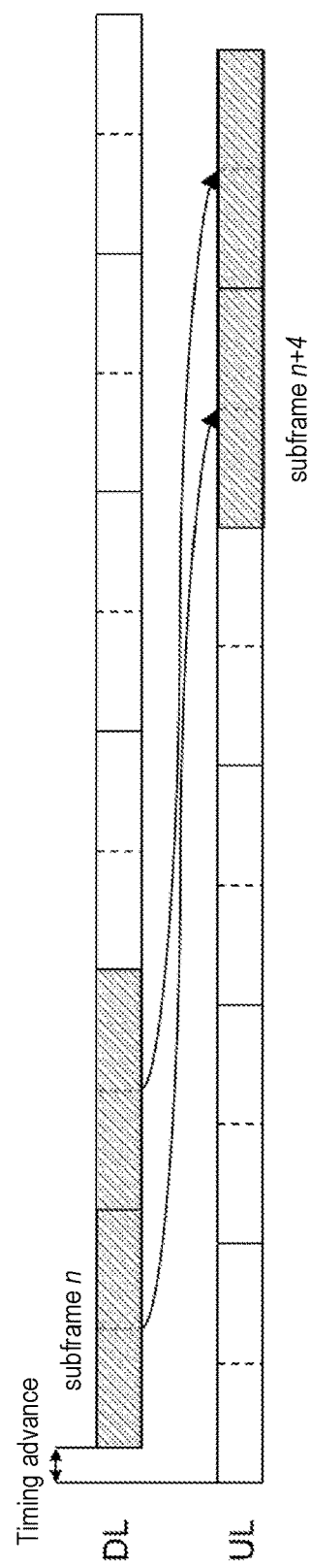
FIG. 11 illustrates the timing of ACK/NACK feedback in legacy systems.

In legacy LTE systems, i.e., those LTE systems operating according to Release 11 or earlier of the 3GPP specifications, DL scheduling is done on a 1-millisecond subframe basis. The scheduling messages are sent each subframe, and the granted resource occupies all of the OFDM symbols allocated to the PDSCH in the resource block pairs allocated to the UE in the resource grant. The processing time allowed to the terminal for completing all processing related to a transmission in a given subframe is 3 milliseconds, less the timing advance. The specifications for LTE thus specify that the ACK/NACK in response to a PDSCH transmission in subframe n should be transmitted in the UL in subframe n+4, no matter the size of the transport block or when the assignment ends. This is illustrated in FIG. 11.

In a system in which sub-subframe assignments are possible, this rigid approach is wasteful, since the processing time required for the terminal depends on the duration of the PDSCH assignment, as well as the size of the transport block. This means that when a UE detects that the assignment is scheduled only on a consecutive subset of the OFDM symbols in a subframe, referred to as a "sub-subframe", it is in principle able to transmit the ACK/NACK feedback earlier than what would be possible for the case when all symbols in the subframe are used.

The techniques detailed below are based on an assumption that an LTE terminal can receive PDSCH resource assignments on all or on only a subset of OFDM symbols within a 1-millisecond subframe and that the resource assignments can vary from one subframe to another. More generally, it will be appreciated that the techniques may be applied to communications between one wireless device and another, where transmissions of data from a first wireless device to a second wireless device in a given subframe can occupy a duration that is less than a maximum data transmission duration that is possible within the subframe, where the term "subframe" may be understood to refer to a default transmission-time interval (TTI) in a given wireless system.

According to several embodiments of the techniques detailed below, a wireless device determines a transmission time for transmitting ACK/NACK feedback in response to a received data transmission (e.g., a PDSCH transmission) in a given subframe, based on the duration of the data transmission within the subframe and/or based on the timing of the data transmission within the subframe. In the LTE context, a wireless terminal determines the timing for transmitting ACK/NACK feedback based on the specific set of OFDM symbols within the given downlink subframe that is used for the PDSCH and/or, equivalently, the transmission time and type of the control channel used to signal the resource assignment. In some embodiments, the first available uplink ACK/NACK transmission opportunity satisfying a particular delay with respect to the last OFDM symbol used for the PDSCH transmission is used for the ACK/NACK transmission, where the particular delay is based on the duration of the PDSCH transmission.

According to this general approach, then, when the resource assignment is shorter than a full subframe and hence carries less data, the time to the ACK/NACK feedback is shorter as well, compared to the case with a (legacy) resource assignment for the entire subframe. This can result in that ACK/NACKs from PDSCH transmissions in different downlink subframes may be transmitted simultaneously in the uplink, which can be accommodated, for example, with ACK/NACK multiplexing or ACK/NACK bundling. Embodiments of the techniques described in further detail below also account for timing advance and/or the transport block size of the downlink transmission. Compared to existing HARQ ACK/NACK timing, the currently disclosed techniques describe timing rules with higher resolution, to enable more timely HARQ ACK/NACK feedback, which can lead to improved latency in wireless communications.

As shown in FIG. 2, above, the assumption is that a terminal can be configured in a low-latency operational mode, where there can be PDSCH assignments of different durations, including both legacy assignments of subframes with 1-millisecond duration as well as assignments of shorter duration, so called sub-subframes (SSF). The type of PDSCH assignment in terms of duration can vary from subframe to subframe. However, for any kind of assignment, there is a need to provide ACK/NACK feedback, both in response to assigned subframes as well as sub-subframes.

Determining ACK/NACK Feedback Timing

If the ACK/NACK feedback timing is determined using the existing solution depicted in FIG. 11, the ACK/NACK is sent in the uplink (UL) subframe starting 3 ms-TA (TA=timing advance) after the end of the received downlink (DL) subframe. Since the maximum allowed timing advance is around 0.7 milliseconds, the terminal has 2.3 milliseconds available for processing time (for FDD). 1-millisecond subframes are also used in the uplink, meaning that there are UL ACK/NACK transmission opportunities (starting) every millisecond, and the existing solution is to use the first available UL ACK/NACK opportunity after a delay of 2.3 milliseconds. This means that latency benefits of a sub-subframe assignment as compared to assigning a full subframe are lost, in general. Small packets not requiring retransmissions still benefit from subframe split, of course.

In various embodiments of the techniques detailed herein, an UL ACK/NACK feedback transmission opportunity may be associated with an UL subframe number, a slot within the subframe, or even a particular (SC-FDMA) symbol within the slot. Determining ACK/NACK feedback timing means to determine which such UL ACK/NACK feedback opportunity to use. It should be noted that for a given transmission opportunity, there can be different ways to convey the information. For example, the ACK/NACKs can be transmitted using either a PUCCH transmission, or on PUSCH if there is data to be transmitted in the uplink as well.

According to some of the techniques described herein, the terminal will, based on the sub-subframe time domain resource assignment, in terms of duration as well as in terms of first/last OFDM symbol, determine when the ACK/NACK feedback is to be transmitted in the UL, i.e. which transmission opportunity is to be used. More generally, the timing may be determined based on exactly which symbols of the downlink subframe are used for the downlink data transmission—this more general formulation allows for the possibility of downlink transmissions that use non-consecutive symbols in a given downlink subframe. The amount of data, e.g. in terms of transport block size and number of spatial multiplexing layers, as well as the (configured maximum allowed) timing advance value can also be accounted for when determining the feedback time.

The determination is characterized by the following:

The shorter the duration of the assignment, the earlier the ACK/NACK feedback.

The earlier the last symbol of the assignment, the earlier the ACK/NACK feedback.

The smaller the payload, and possibly the lower the number of spatially multiplexed layers, the earlier the ACK/NACK feedback.

The smaller the configured maximum timing advance, the earlier the ACK/NACK feedback.

Conversely, longer assignments, ending later, with more spatially multiplexed layers and larger (allowed maximum) timing advance, lead to later ACK/NACK feedback.

The most straightforward way is to consider all possible PDSCH resource assignments within a subframe. For the case with 14 OFDM symbols there are 14 possible allocations of a single symbol, there are 14-choose-2 possible allocations of two symbols, 14-choose-3 possible allocations of three symbols, and so on. If one only considers allocations of consecutive symbols, there are 14+13+12+ . . . +1 possible allocations. There is, therefore, a large number of possible allocations and thus a need to efficiently handle them.

Approach: Divide into Sub-subframes

One approach to determining the feedback timing is to (i) define a reasonable number of enumerated sub-subframes, comprising a set of (typically consecutive) OFDM symbols, (ii) associate a feedback timing with each defined sub-subframe, and (iii) establish a common understanding of the defined sub-subframes and associated feedback timing between the UE and the eNodeB.

With these definitions, the UE then associates each PDSCH assignment within each subframe with one of the pre-determined, enumerated, sub-subframes, and thereby learns the feedback timing. More specifically, the association can be done in such a way that the terminal searches all sub-subframes whose symbol set contains all assigned OFDM symbols and finds the one with the earliest feedback timing.

Since the legacy 1-millisecond full subframe allocation is assumed to be available, all PDSCH resource assignments can be associated with a sub-subframe or a legacy subframe and since there are feedback timing relations defined, the UE as well as the eNodeB knows the feedback timing.

TABLE 1

Example of feedback timing depending on downlink assignment and uplink structure

| Sub-subframe allocation | OFDM symbols within the subframe n | Feedback time | | |
|---|---|---|---|---|
| | | Subframe-based UL | Slot-based UL | Symbol-based UL |
| 0 | All symbols except PDCCH (legacy) | Subframe n + 4 | Subframe n + 4, slot 0 | Subframe n + 4, symbol 0, slot 0 |
| 1 | All symbols in first slot except PDCCH, 1-7 | Subframe n + 2 | Subframe n + 2, slot 0 | Subframe n + 2, symbol 0 (slot 0) |
| 2 | All symbols in second slot, 8-14 | Subframe n + 3 | Subframe n + 2, slot 1 | Subframe n + 2, symbol 8 (slot 1) |
| 3 | Symbols in both slots, 5, 6, 7, 8, 9, 10 | Subframe n + 3 | Subframe n + 2, slot 1 | Subframe n + 2, symbol 3 (slot 0) |

An example is given in Table 1, above, where symbol numbering is done on a subframe level, for illustrative purposes. The possible feedback time depends on the granularity of the uplink, i.e., how often there is an ACK/NACK opportunity in the UL. In Table 1, the sub-subframe allocation 0 corresponds to the legacy case, where a 3 ms-TA processing time is assumed. In the allocation examples 1, 2 and 3, a 1.5 ms-TA processing time, beginning after the last OFDM symbol of that allocation, has been assumed.

Table 1 may give an impression that a solution is very complicated since there are so many columns depending on the UL granularity. It is however possible to simplify this and only define an earliest possible feedback time, and read out a first possible feedback time from the symbol-based column From this value, the terminal can then select the first possible opportunity that follows the earliest possible feedback time. This is feasible in a system where the UL granularity has more than one value, e.g. it has a fallback to the legacy 1-millisecond uplink transmission, since the processing time needs to meet the requirements of the finest UL granularity anyway. Thus, the UE would read the first possible feedback timing from a column that corresponds to the finest UL granularity the system or the UE category supports. The associated feedback time may take the positions of the reference signal used for demodulation into account. A situation where this could be beneficial is when the last symbol of the downlink assignment occurs close to the following reference signal (RS) symbol. This would then give the UE time to wait for the next RS symbol before attempting to decode. If the next RS symbol is far away, however, the added accuracy in channel estimation might not be worth the added delay that comes from waiting longer.

Variant of the Approach: Symbol-level Granularity

An alternative but essentially equivalent approach to that described above is to associate each downlink OFDM symbol in a subframe to an uplink SC-FDMA symbol in a subsequent uplink subframe, in a one-to-one fashion similar to what is done for UL and DL subframes. The j-th symbol of DL subframe n is then associated with the j'th symbol of UL subframe n, for example.

A certain number of sub-subframes are defined by forming a sub-subframe as resource assignments starting in symbol l and having a duration d symbols. By letting d and l assume different values, a set of sub-subframes may be formed.

The associated ACK/NACK feedback time may be defined in several ways. For example, the ACK/NACK feedback may be provided in the first ACK/NACK feedback opportunity starting at or after UL symbol $t=l+(d-1)+P*d+M$, where P and M are pre-determined parameters, either defined in the specification or configured by means of higher layer signaling. Examples of parameters include P=3 and M=0, or P=0 and M=17, where the first example represents a case when the processing time needed truly scales with the length of the resource assignment and the latter example represents a case when the decoding complexity is independent of the resource assignment duration. Another way to define the ACK/NACK is to specify that the ACK/NACK feedback is to be provided in the first ACK/NACK feedback opportunity starting at or after UL symbol t, where the UL symbol t is mapped from a general function f(d,l) of d and l. Such a mapping can be defined in a specification or configured by higher layers. Again, for a resource allocation, the terminal selects the feedback time by finding the corresponding index K such that the feedback time is minimized while at the same time, the PDSCH assignment is confined within in the symbols defined by d and l.

Transport Block Size and Number of Spatially Multiplexed Layers

Since processing time for a given downlink transmission depends on the transport block size of the downlink transmission, as well as the number of spatially multiplexed layers, there can be several feedback times associated with each sub-subframe index, either by means of multiple columns or by means of an adjustment/scaling of the value. The terminal will then select the actual feedback time based on the transport block size and/or the number of spatially multiplexed layers.

Timing Advance

A maximum timing advance value of 0.67 milliseconds is defined in the LTE specifications, to correspond to a requirement to support an approximately 100-kilometer cell radius. A UE implementation needs to be prepared for this value, irrespective of the TA value actually signaled by the eNodeB at any given time. As it is expected that the sub-subframe scheduling is less likely to be used for cell-edge UEs in a macro cell, but is more feasible for small cell UEs, a relaxation to the maximum TA value seems relevant. The idea here is to define a set of maximum TA values, say 100 us, 200 us, etc., that define the TA that the UE needs to accommodate with the certain possible feedback timing requirements. Associated with each maximum TA value there may be a separate feedback timing rule.

Preferably, the feedback timing and maximum timing advanced is configured by higher layer signaling. In one embodiment, the TA value signaled by the MAC layer is used, in the sense that the terminal selects the feedback timing with the smallest maximum TA that is larger than the signaled TA. The idea here is to relax feedback timing for larger TA values in order to achieve faster feedback timing when TA is small.

Subframe Truncation

When the maximum timing advance can be assumed to be small, e.g., in a small cell, it may be feasible for the UE to generate and transmit the ACK/NACK feedback corresponding to a legacy PDSCH transmission already in subframe n+3, rather than in subframe n+4, if the UE is allowed to truncate the last few OFDM symbols of the legacy PDSCH transmission, meaning that the UE tries to decode the PDSCH transmission before it has received the entire transmission. For small data transmissions this may help to reduce the latency. One benefit with this approach is that the impact on the PDSCH processing in eNodeB will be very small. A drawback is that there will be some performance loss associated with the truncation. The truncated OFDM symbols can still be stored in the HARQ buffer in the UE and be combined with potential HARQ retransmission(s). The case with subframe truncation may be viewed as an embodiment where the sub-subframe allocation represents which symbols the UE expected to use for decoding and generation on ACK/NACK feedback.

Multiple PDSCH Assignments

There can be several sub-subframe PDSCH assignments to the same UE within a subframe, in some embodiments. Since ACK/NACK responses are needed for all of them, the UE may, in some embodiments, apply the feedback timing rules discussed above to each such assignment, independently.

Multiple ACK/NACK Feedback

Multiple ACK/NACKs associated with PDSCH resource assignments, in different as well as in the same subframe, may have the same ACK/NACK feedback time. Mechanisms to handle this situation include so-called ACK/NACK bundling, as well as multiplexing techniques as defined already for the LTE TDD mode of operation, as well as for carrier aggregation.

Control Channel Characteristics

At least for dynamically scheduled PDSCH transmission, some form of a control channel will be used to assign the PDSCH, either a PDCCH with a certain DCI format, or a new form of control channel which is transmitted more often. The control information will indicate, either explicitly by means of DCI contents, or implicitly by means of when, in which symbol it is transmitted, the sub-subframe which the PDSCH resource assignment is to be associated with. Hence, since there is a one-to-one association between the PDSCH resource assignment and the control channel characteristics and contents, the ACK/NACK feedback time may in certain embodiments be determined directly from attributes of the control channel. It will be appreciated that while this approach may not directly use the downlink transmission duration or the precise timing of the downlink transmission within the subframe to identify the timing for ACK/NACK feedback, it can still be said that the ACK/NACK feedback time is based on the duration and/or timing of the downlink transmission within the subframe, since the characteristics of the PDCCH in these embodiments are used to determine a one-to-one association between the PDCCH message and the downlink transmission characteristics.

Slot Based DL and Subframe Based UL

In some embodiments, a slot-based downlink is utilized, where the downlink transmissions can be scheduled for an entire subframe (both slots), or for one of the two (or more) slots in the subframe, or separately for each of the two slots of the subframe. In this example implementation, the slot-based downlink is coupled with a subframe-based uplink. In this case, the assumption is that UE forms one ACK/NACK for scheduling assignments during the first slot (or another predefined period within a subframe) and one ACK/NACK for the second slot. The DL assignments may be 1-7 OFDM symbols each and there may be several sub-subframes assigned. As mentioned above, when there are several sub-subframes assigned, the UE may deduce single ACK/NACK feedback or otherwise multiplex the information.

Figure 12:
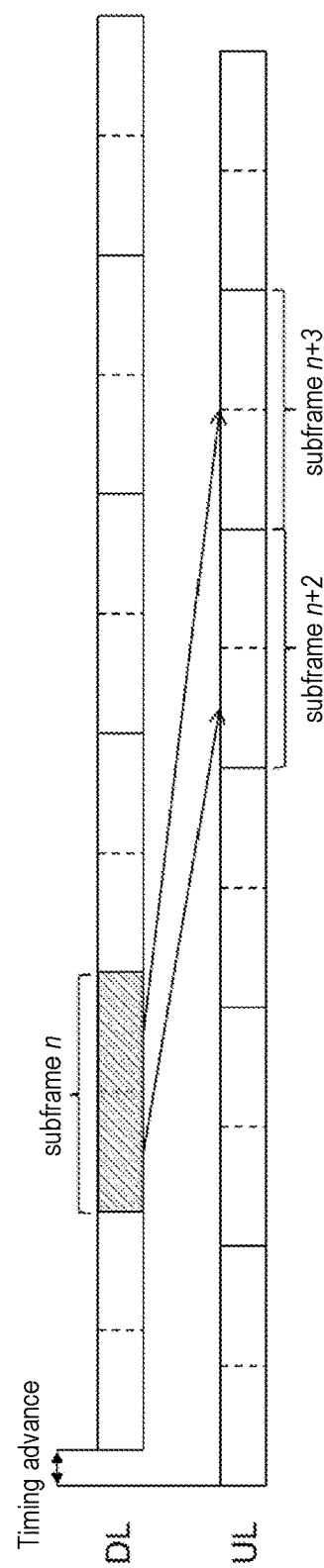
FIG. 12 illustrates the timing of ACK/NACK feedback in an example implementation that uses slot-based downlink and subframe-based uplink.

Currently, the duration for an uplink transmission is 1 millisecond, meaning that there is a new opportunity each millisecond and that the duration of each transmission is millisecond. In such a case and for the embodiment above, the time until ACK/NACK reporting when scheduled in the first slot may be set to 2, in some embodiments, meaning that the ACK/NACK for downlink transmissions in the first slot of subframe n is reported in subframe n+2. Similarly, data scheduled in the second slot of subframe n may be acknowledged in subframe n+3. This is illustrated in FIG. 12.

Slot Based DL and Slot Based UL

Figure 13:
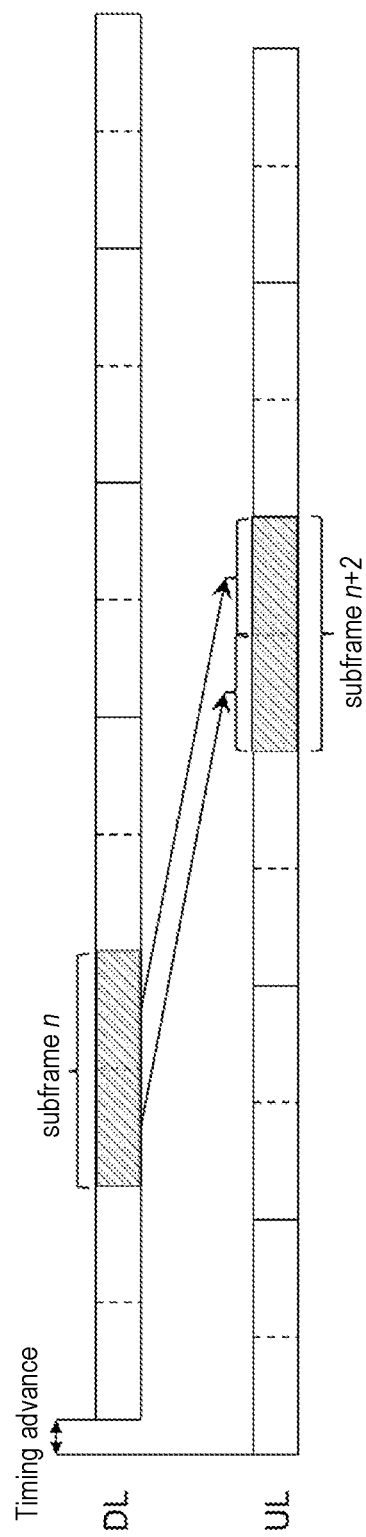
FIG. 13 illustrates the timing of ACK/NACK feedback in an example implementation that uses slot-based downlink and slot-based uplink.

Some embodiments may utilize a slot-based downlink and a slot-based uplink. In this case, there would be two transmission opportunities for ACK/NACK feedback in the uplink, one for each slot. For the case with slot-level scheduling, assuming 0.5-millisecond processing time reductions, this would mean that the ACK/NACK associated with the scheduling during the first slot of subframe n is transmitted in the first slot of the UL subframe n+2 whereas the ACK/NACK associated with the scheduling of the second slot of subframe n is transmitted the second slot of subframe n+2. This is illustrated in FIG. 13.

Multiple ACK/NACK Feedback

Figure 14:
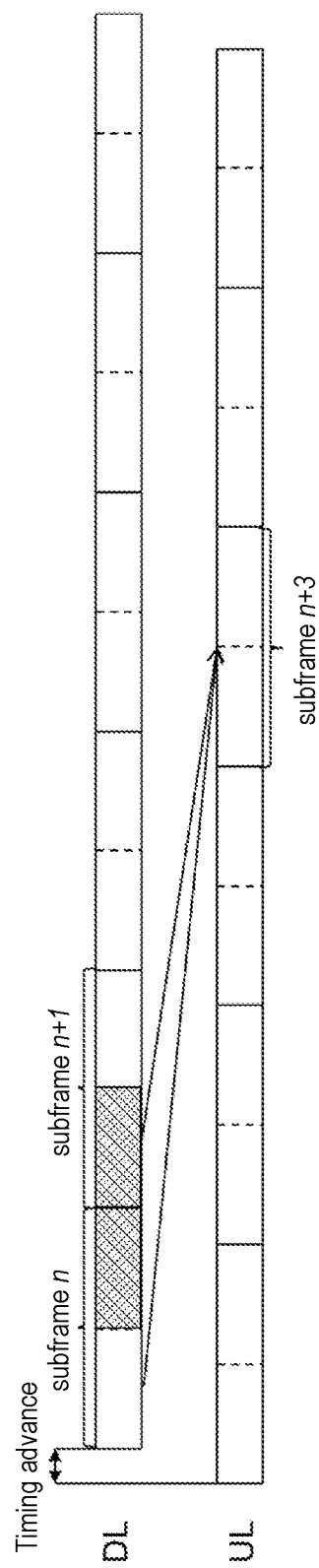
FIG. 14 illustrates ACK/NACK bundling and/or multiplexing, according to some embodiments.

Two examples are provided where multiple ACK/NACKs are to be sent in the same feedback opportunity. FIG. 14 shows an example with slot-based operation in both UL and DL. Here the second slot in subframe n and the first slot in subframe n+1 are assigned to the same UE, and the ACK/NACK response for both assignments is to be provided in subframe n+2. In this case, ACK/NACK bundling or multiplexing, such as is already done in LTE TDD, can be done also here. If different UEs are scheduled in the two different slots, then there should be no need for multiplexing or bundling.

Figure 15:
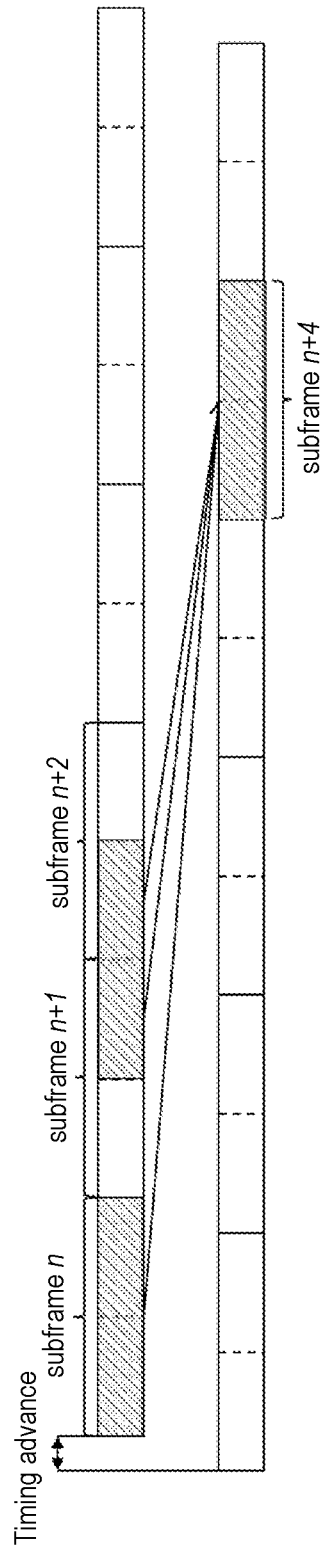
FIG. 15 is another example of ACK/NACK bundling and/or multiplexing, according to some embodiments.

FIG. 15 shows the situation when subframe n is scheduled as a normal 1-millisecond subframe, and the following subframes are scheduled as slot pairs. Then, ACK/NACK for subframe n, slot 1 of subframe n+1, and slot 0 of subframe n+2 should all be sent in subframe n+4. Again, bundling and/or multiplexing solutions can be used to feed back ACK/NACKs associated with all the PDSCH assignments.

Figure 16:
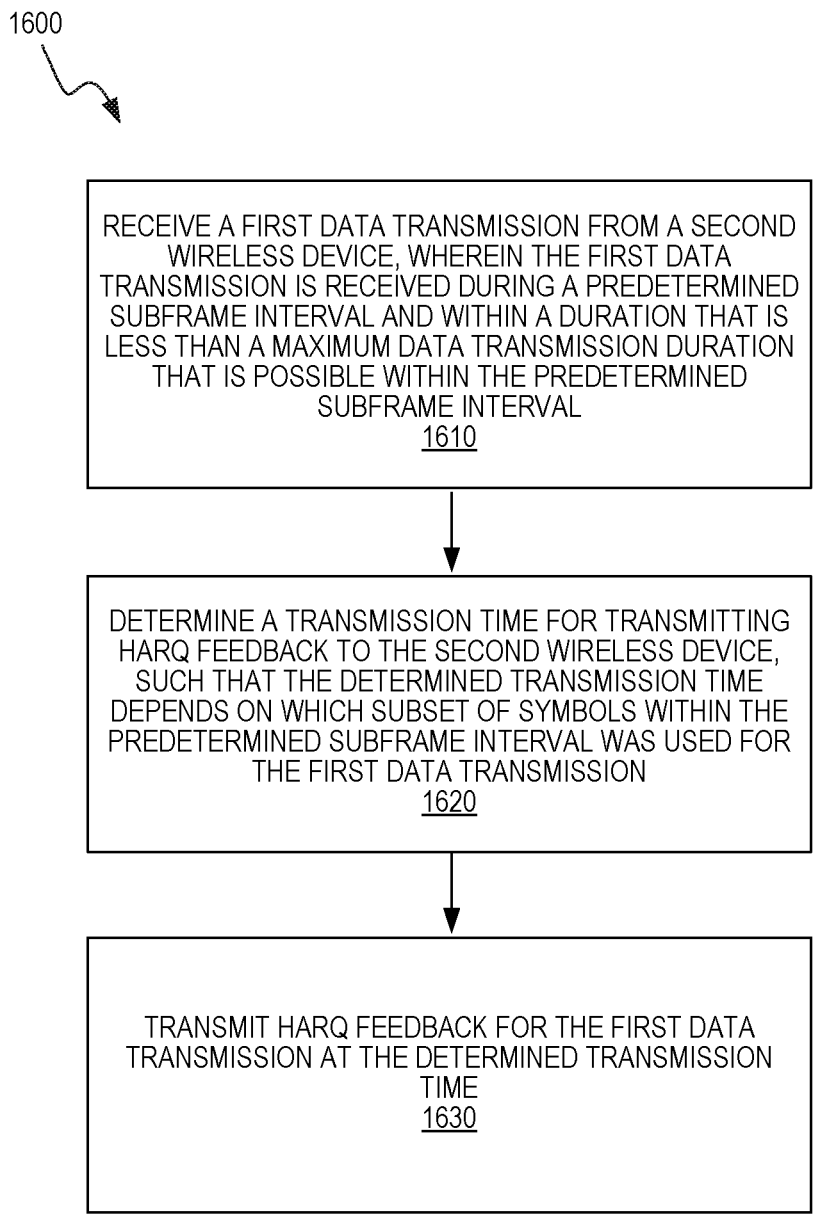
FIG. 16 is a process flow diagram illustrating a method, according to some embodiments.

In view of the detailed example embodiments described above, it will be appreciated that FIG. 16 illustrates a generalized method 1600 according to some of the techniques described herein, as implemented in a wireless device that receives a data transmission in a first subframe and acknowledges that transmission with ACK/NACK feedback. This method might be implemented in an LTE UE adapted to carry out the presently disclosed techniques.

As shown at block 1610, the method 1600 includes receiving a first data transmission from a second wireless device, where the first data transmission is received during a predetermined subframe interval and within a duration that is less than a maximum data transmission duration that is possible within the predetermined subframe interval. As shown at block 1620, the method 1600 includes determining a transmission time for HARQ feedback to the second wireless device, such that the determined transmission time depends on which subset of symbols within the predetermined subframe interval was used for the first data transmission. The method 1600 further includes transmitting HARQ feedback for the first data transmission at the determined transmission time (block 1630).

In some embodiments, determining the transmission time for transmitting HARQ feedback to the second wireless device may include determining the transmission time based on the duration of the first data transmission or a timing of the first data transmission within the predetermined subframe interval, or both. In some embodiments, the length of the predetermined subframe interval is 1 millisecond and consists of 14 OFDM symbols.

In some embodiments, the determined transmission time is based on the duration of the first data transmission and a position, within the predetermined subframe interval, of a last symbol of the first data transmission. In some other embodiments, the predetermined subframe interval has a first slot and a second slot, the first data transmission is received entirely within either the first slot or the second slot, and the determined transmission time depends on whether the first data transmission is received in the first slot or the second slot.

In some embodiments, determining the transmission time comprises retrieving an offset value from a lookup table indexed by an allocation index corresponding to at least the duration of the first data transmission, and identifying the transmission time based on the retrieved offset value and a timing of the first data transmission. In some of these and in some other embodiments, the determined transmission time further depends on any one or more of a transport block size for the first data transmission, a number of spatially multiplexed layers for the first data transmission, and a timing advance value. In some embodiments, transmitting HARQ feedback for the first data transmission at the determined transmission time comprises bundling the HARQ feedback for the first data transmission with additional HARQ feedback for an additional data transmission received by the first wireless device in an interval different from the interval in which the first data transmission is received.

Figure 17:
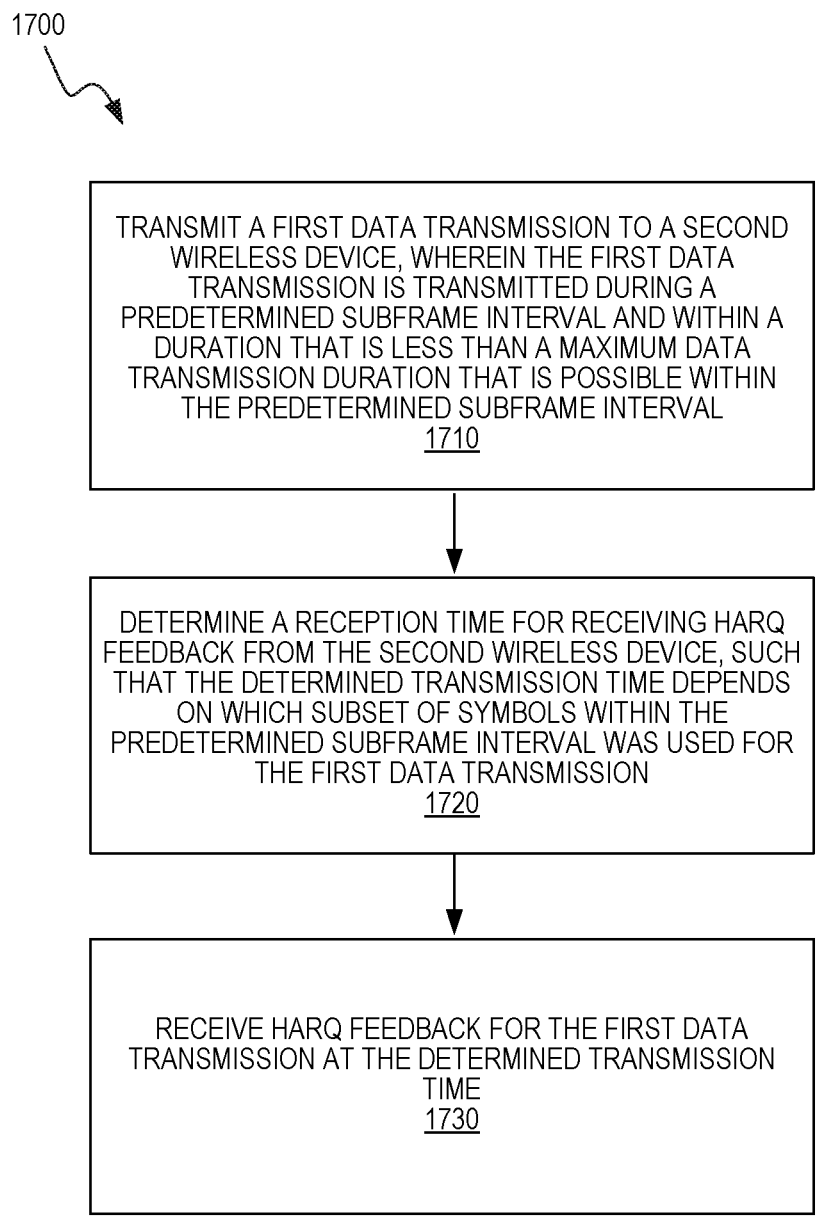
FIG. 17 is a process flow diagram illustrating another method, according to some embodiments.

FIG. 17 illustrates another generalized method 1700 according to some of the techniques described herein, as implemented in a wireless device that transmits a data transmission in a first subframe and receives an acknowledgement of that transmission in ACK/NACK feedback. This method may be implemented in an LTE eNodeB adapted to carry out the presently disclosed techniques.

As shown at block 1710, the method includes transmitting a first data transmission to a second wireless device, where the first data transmission is transmitted during a predetermined subframe interval and within a duration that is less than a maximum data transmission duration that is possible within the predetermined subframe interval. The method also includes determining a reception time for receiving HARQ feedback from the second wireless device, such that the determined transmission time depends on which subset of symbols within the predetermined subframe interval was used for the first data transmission, as shown at block 1720. Finally, as shown at block 1730, the method includes receiving HARQ feedback for the first data transmission at the determined transmission time.

In some embodiments, determining the reception time for receiving HARQ feedback from the second wireless device comprises determining the transmission time based on the duration of the first data transmission or a timing of the first data transmission within the predetermined subframe interval, or both. In some embodiments, the length of the predetermined subframe interval is 1 millisecond and consists of 14 orthogonal frequency-division multiplexing (OFDM) symbols.

In some embodiments, the determined reception time is based on the duration of the first data transmission and a position, within the predetermined subframe interval, of a last symbol of the first data transmission. In some other embodiments, the predetermined subframe interval has a first slot and a second slot, the first data transmission is transmitted entirely within either the first slot or the second slot, and the determined reception time depends on whether the first data transmission is transmitted in the first slot or the second slot.

In some embodiments, determining the transmission time comprises retrieving an offset value from a lookup table indexed by an allocation index corresponding to at least the duration of the first data transmission, and identifying the transmission time based on the retrieved offset value and a timing of the first data transmission. In some embodiments, the determined transmission time further depends on any one or more of a transport block size for the first data transmission, a number of spatially multiplexed layers for the first data transmission, and a timing advance value. In some embodiments, receiving HARQ feedback for the first data transmission at the determined transmission time comprises receiving bundled feedback comprising the HARQ feedback for the first data transmission and additional HARQ feedback for an additional data transmission transmitted to the second wireless device in an interval different from the interval in which the first data transmission is transmitted.

FIG. 18 illustrates another generalized method 1800 according to some of the techniques described herein, as implemented in a wireless device such as an LTE UE. The method 1800 includes receiving a first data transmission from a second wireless device, where the first data transmission is received during a predetermined subframe interval (block 1810). The receiving includes decoding fewer than all of a scheduled number of symbols in the first data transmission. The method 1800 also includes determining a transmission time for transmitting HARQ feedback to the second wireless device, such that the determined transmission time depends on which subset of symbols within the predetermined subframe interval was used in said decoding (block 1820). The method 1800 further includes transmitting HARQ feedback for the first data transmission at the determined transmission time (block 1830). The determined transmission time may depend on the position of the last symbol used in the decoding.

Figure 19:
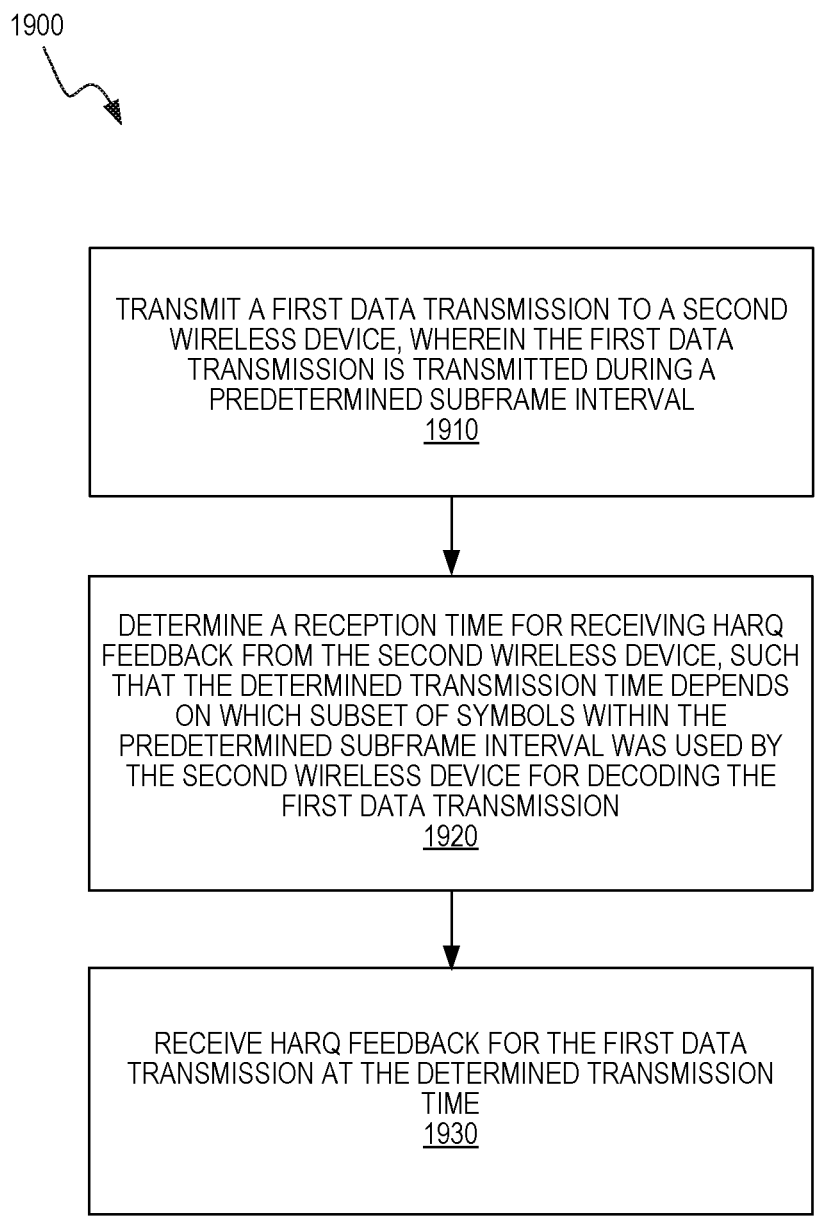
FIG. 19 is a process flow diagram illustrating another method, according to some embodiments.

FIG. 19 illustrates another generalized method 1900 according to some of the techniques described herein, as implemented in a wireless device such as an LTE eNB. The method 1900 includes transmitting a first data transmission to a second wireless device, where the first data transmission is transmitted during a predetermined subframe interval (block 1910). The method 1900 also includes determining a reception time for receiving HARQ feedback from the second wireless device, such that the determined transmission time depends on which subset of symbols within the predetermined subframe interval was used by the second wireless device for decoding the first data transmission (block 1920). The method further includes receiving HARQ feedback for the first data transmission at the determined transmission time (block 1930). The determined transmission time may depend on the position of the last symbol used by the second wireless device in decoding the first data transmission.

The functions in the various techniques and process flow diagrams discussed above may be implemented using electronic data processing circuitry provided in a mobile terminal and in a base station, or in multiple wireless devices. Each mobile terminal and base station, of course, also includes suitable radio circuitry for receiving and transmitting radio signals formatted in accordance with known formats and protocols, such as the LTE formats and protocols.

Figure 20:
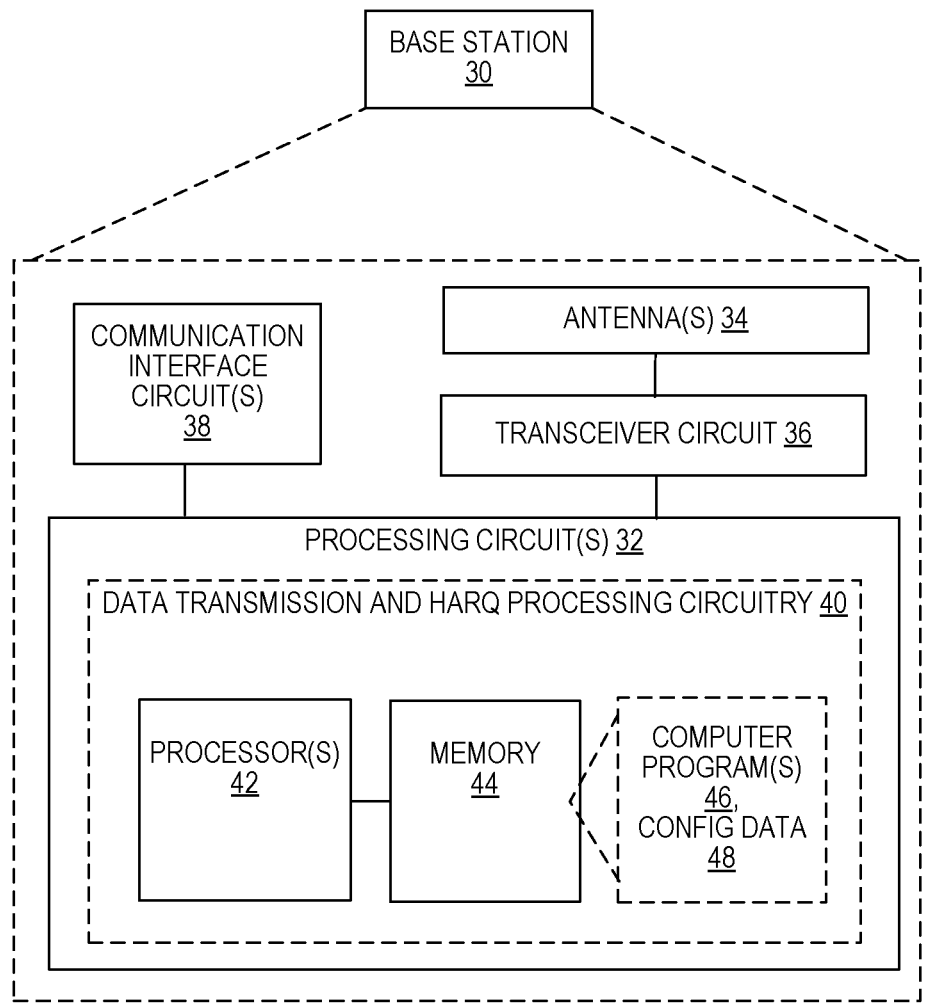
FIG. 20 illustrates an example base station, according to some embodiments.

FIG. 20 illustrates a diagram of an example radio base station 30, according to some embodiments. The base station 30 provides an air interface to wireless devices, e.g., an LTE air interface for downlink transmission and uplink reception, which is implemented via antennas 34 and a transceiver circuit 36. The transceiver circuit 36 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, general packet radio service (GPRS), wideband code division multiple access (WCDMA), high-speed downlink packet access (HSDPA), LTE and LTE-Advanced. The base station 30 may also include a communication interface circuit 38 for communicating with nodes in the core network such as a network node, other peer radio nodes, and/or other types of nodes in the network. The base station 30 may be, for example, an eNodeB.

The base station 30 also includes one or more processing circuits 32 that are operatively associated with the communication interface circuit 38 and transceiver circuit 36. The processing circuit 32 comprises one or more digital processors 42, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 32 may comprise fixed circuitry, or programmable circuitry that is specially configured via the execution of program instructions implementing the functionality taught herein, or may comprise some mix of fixed and programmed circuitry. The processor 32 may be multi-core.

The processing circuit 32 also includes a memory 44. The memory 44, in some embodiments, stores one or more computer programs 46 and, optionally, configuration data 48. The memory 44 provides non-transitory storage for the computer program 46 and it may comprise one or more types of computer-readable media, such as disk storage, solid-state memory storage, or any mix thereof. By way of non-limiting example, the memory 44 comprises any one or more of SRAM, DRAM, EEPROM, and FLASH memory, which may be in the processing circuit 32 and/or separate from the processing circuit 32. In general, the memory 44 comprises one or more types of computer-readable storage media providing non-transitory storage of the computer program 46 and any configuration data 48 used by the base station 30.

In some embodiments, the processor 42 executes a computer program 46 stored in the memory 44 that configures the processor 42 to transmit a first data transmission to a second wireless device, where the first data transmission is transmitted during a predetermined subframe interval and within a duration that is less than a maximum data transmission duration that is possible within the predetermined subframe interval. The processor 42 is configured to determine a reception time for receiving HARQ feedback from the second wireless device, such that the determined transmission time depends on which subset of symbols within the predetermined subframe interval was used for the first data transmission, and to receive HARQ feedback for the first data transmission at the determined transmission time. This functionality may be performed by Data Transmission and HARQ Processing Circuit 40 in the processing circuit 32. Of course, the processing circuit 32 may be configured to carry out any of the variants of the methods described above.

In other embodiments, the processing circuit 32 is configured to transmit a first data transmission to a second wireless device, where the first data transmission is transmitted during a predetermined subframe interval. The processing circuit 32 is also configured to determine a reception time for receiving HARQ feedback from the second wireless device, such that the determined transmission time depends on which subset of symbols within the predetermined subframe interval was used by the second wireless device for decoding the first data transmission. The processing circuit 32 is configured to receive HARQ feedback for the first data transmission at the determined transmission time.

Figure 21:
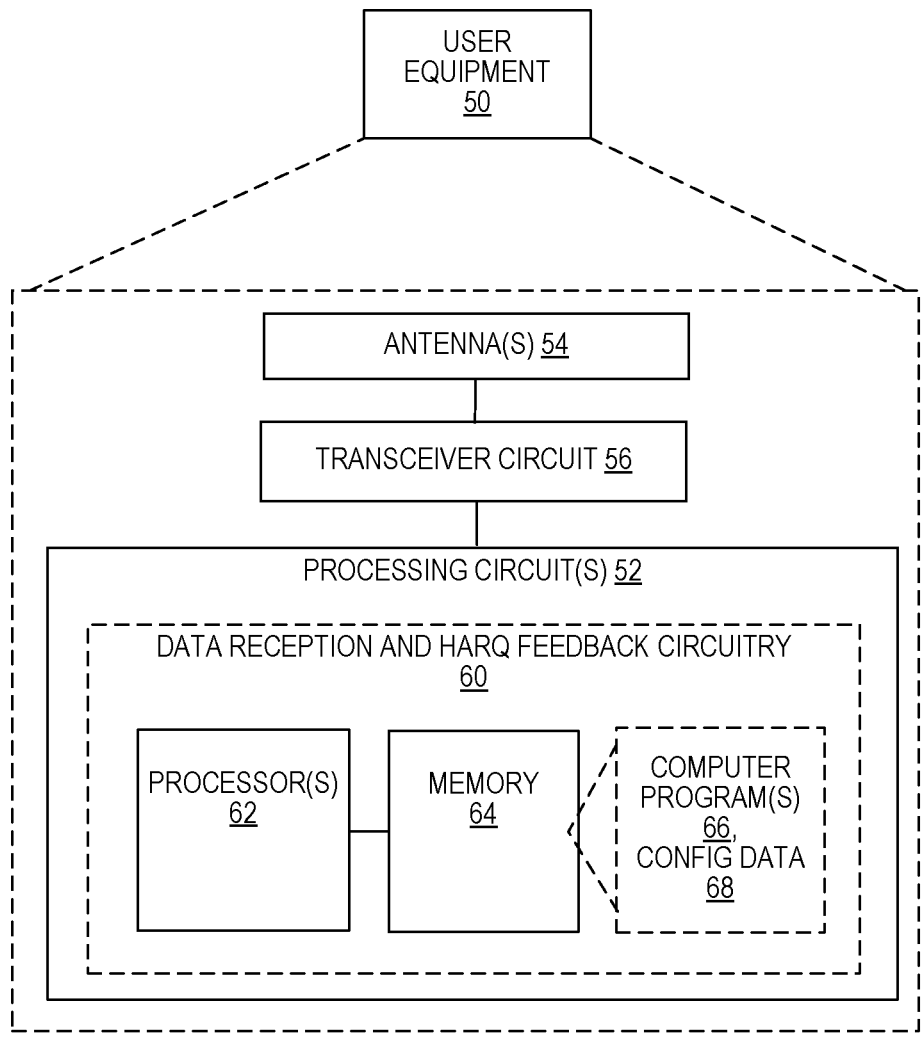
FIG. 21 illustrates an example UE, according to some embodiments.

FIG. 21 illustrates a diagram of a wireless device, such as a user equipment 50, according to some embodiments. To ease explanation, the user equipment 50 may also be considered to represent any wireless devices that perform machine to machine (M2M) communications or machine-type communication (MTC). The user equipment 50 communicates with a radio node or base station, such as base station 30, via antennas 54 and a transceiver circuit 56. The transceiver circuit 56 may include transmitter circuits, receiver circuits, and associated control circuits that are collectively configured to transmit and receive signals according to a radio access technology, for the purposes of providing cellular communication services. According to various embodiments, cellular communication services may be operated according to any one or more of the 3GPP cellular standards, GSM, GPRS, WCDMA, HSDPA, LTE and LTE-Advanced.

The user equipment 50 also includes one or more processing circuits 52 that are operatively associated with the radio transceiver circuit 56. The processing circuit 52 comprises one or more digital processing circuits, e.g., one or more microprocessors, microcontrollers, Digital Signal Processors or DSPs, Field Programmable Gate Arrays or FPGAs, Complex Programmable Logic Devices or CPLDs, Application Specific Integrated Circuits or ASICs, or any mix thereof. More generally, the processing circuit 52 may comprise fixed circuitry, or programmable circuitry that is specially adapted via the execution of program instructions implementing the functionality taught herein, or may comprise some mix of fixed and programmed circuitry. The processing circuit 52 may be multi-core.

The processing circuit 52 also includes a memory 64. The memory 64, in some embodiments, stores one or more computer programs 66 and, optionally, configuration data 68. The memory 64 provides non-transitory storage for the computer program 66 and it may comprise one or more types of computer-readable media, such as disk storage, solid-state memory storage, or any mix thereof. By way of non-limiting example, the memory 64 comprises any one or more of SRAM, DRAM, EEPROM, and FLASH memory, which may be in the processing circuit 52 and/or separate from processing circuit 52. In general, the memory 64 comprises one or more types of computer-readable storage media providing non-transitory storage of the computer program 66 and any configuration data 68 used by the user equipment 50.

In some embodiments, the processor 62 of the processor circuit 52 executes a computer program 66 stored in the memory 64 that configures the processor 62 to receive a first data transmission from a second wireless device, where the first data transmission is received during a predetermined subframe interval and within a duration that is less than a maximum data transmission duration that is possible within the predetermined subframe interval. The processor 62 is also configured to determine a transmission time for transmitting HARQ feedback to the second wireless device, such that the determined transmission time depends on which subset of symbols within the predetermined subframe interval was used for the first data transmission, and to transmit HARQ feedback for the first data transmission at the determined transmission time. This structure and functionality may be referred to as Data Reception and HARQ Feedback Circuitry 60 in processing circuit 52. Of course, the processor circuit 52 may be configured to carry out any of the variants of the methods described above.

In other embodiments, the processing circuit 52 is configured to receive a first data transmission from a second wireless device, where the first data transmission is received during a predetermined subframe interval, and where said receiving comprises decoding fewer than all of a scheduled number of symbols in the first data transmission. The processing circuit 52 is also configured to determine a transmission time for transmitting HARQ feedback to the second wireless device, such that the determined transmission time depends on which subset of symbols within the predetermined subframe interval was used in said decoding, and to transmit HARQ feedback for the first data transmission at the determined transmission time.

Figure 22:
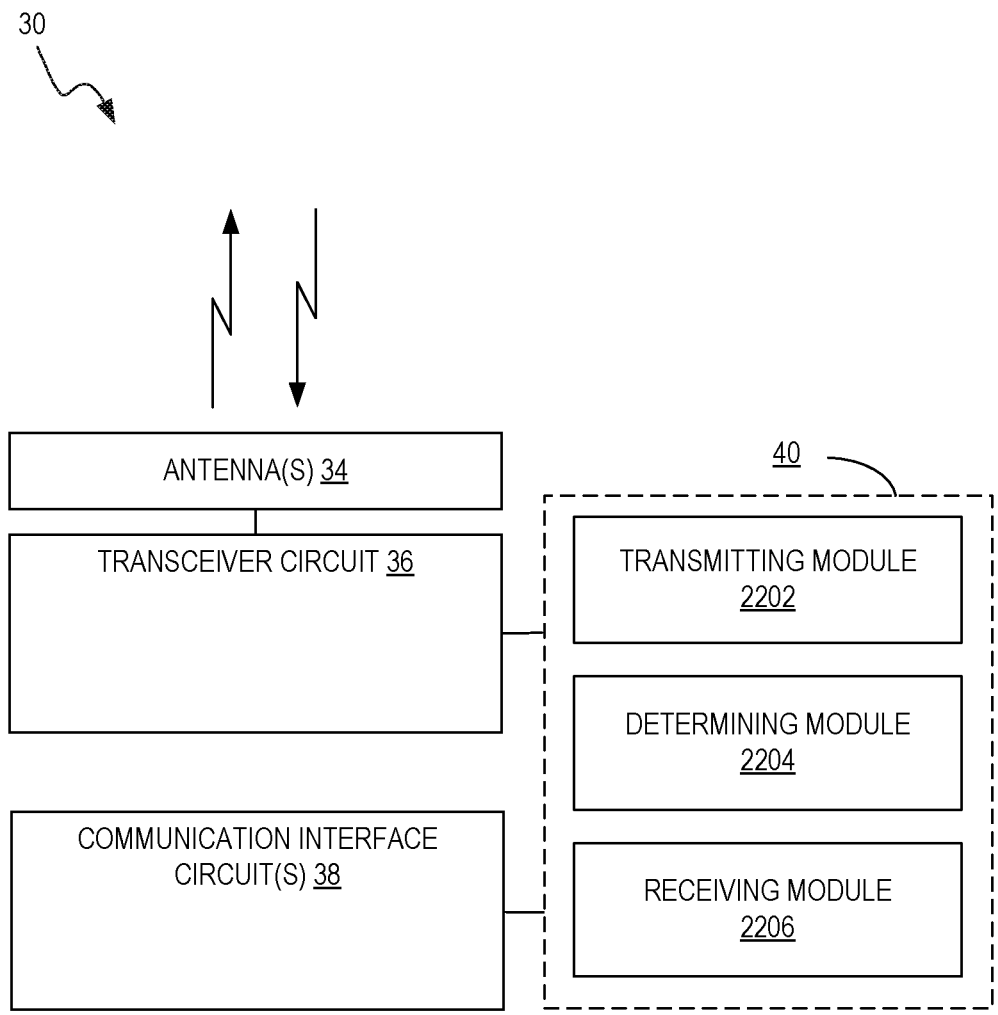
FIG. 22 is a functional illustration of a wireless device, according to some embodiments.

FIG. 22 illustrates an example functional module or circuit architecture as may be implemented in the base station 30, e.g., based on the processing circuitry 40. The illustrated embodiment at least functionally includes a transmitting module 2202 for transmitting a first data transmission to a second wireless device 50, wherein the first data transmission is transmitted during a predetermined subframe interval and within a duration that is less than a maximum data transmission duration that is possible within the predetermined subframe interval. The implementation includes a determining module 2204 for determining a reception time for receiving HARQ feedback from the second wireless device, such that the determined transmission time depends on which subset of symbols within the predetermined subframe interval was used for the first data transmission, and a receiving module 2206 for receiving HARQ feedback for the first data transmission at the determined transmission time.

In some embodiments, the transmitting module 2202 is for transmitting a first data transmission to a second wireless device 50, where the first data transmission is transmitted during a predetermined subframe interval. The determining module 2204 is for determining a reception time for receiving HARQ feedback from the second wireless device 50, such that the determined transmission time depends on which subset of symbols within the predetermined subframe interval was used by the second wireless device 50 for decoding the first data transmission.

Figure 23:
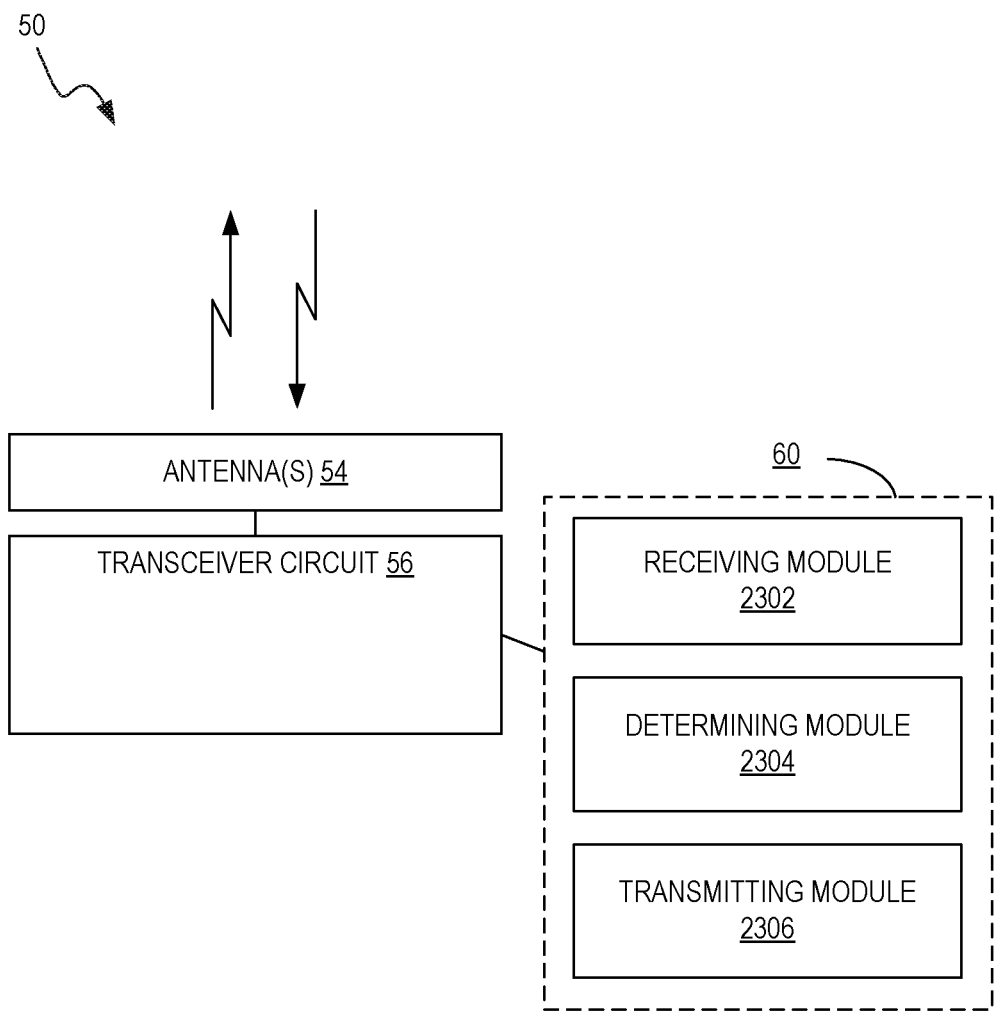
FIG. 23 is a functional illustration of another wireless device, according to some embodiments.

FIG. 23 illustrates an example functional module or circuit architecture as may be implemented in the user equipment 50, e.g., based on the processing circuitry 60. The illustrated embodiment at least functionally includes a receiving module 1302 for receiving a first data transmission from a second wireless device 30, where the first data transmission is received during a predetermined subframe interval and within a duration that is less than a maximum data transmission duration that is possible within the predetermined subframe interval. The implementation also includes a determining module 2304 for determining a transmission time for transmitting HARQ feedback to the second wireless device 30, such that the determined transmission time depends on which subset of symbols within the predetermined subframe interval was used for the first data transmission, and a transmitting module 2306 for transmitting HARQ feedback for the first data transmission at the determined transmission time.

In some embodiments, the receiving module 2302 is for receiving a first data transmission from a second wireless device 30, where the first data transmission is received during a predetermined subframe interval, and where said receiving comprises decoding fewer than all of a scheduled number of symbols in the first data transmission. The determining module 2304 may be for determining a transmission time for transmitting HARQ feedback to the second wireless device 30, such that the determined transmission time depends on which subset of symbols within the predetermined subframe interval was used in said decoding.

It will be appreciated by the person of skill in the art that various modifications may be made to the above described embodiments without departing from the scope of the presently described techniques. For example, it will be readily appreciated that although the above embodiments are described with reference to parts of a 3GPP network, other embodiments will also be applicable to like networks, such as a successor of the 3GPP network, having like functional components. Therefore, in particular, the terms 3GPP and associated or related terms used in the above description and in the enclosed drawings and any appended claims now or in the future are to be interpreted accordingly.

In the above discussion, specific details of particular embodiments of the presently disclosed techniques are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not obscure the description with unnecessary detail. Those skilled in the art will appreciate that the functions described may be implemented in one or in several nodes. Some or all of the functions described may be implemented using hardware circuitry, such as analog and/or discrete logic gates interconnected to perform a specialized function, ASICs, PLAs, etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations may include or encompass, without limitation, digital signal processor (DSP) hardware, a reduced instruction set processor, hardware (e.g., digital or analog) circuitry including but not limited to ASIC and/or FPGAs, and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Because it is not possible, of course, to describe every conceivable combination of components or techniques, those skilled in the art will appreciate that the techniques described above can be implemented in other ways than those specifically set forth herein, without departing from essential characteristics of the techniques. The present embodiments are thus to be considered in all respects as illustrative and not restrictive.

What is claimed is:

1. A method, in a first wireless device, the method comprising:
   receiving a first data transmission from a second wireless device, wherein the first data transmission is received during a predetermined subframe interval and within a duration that is less than a maximum data transmission duration that is possible within the predetermined subframe interval;
   determining a transmission time for transmitting hybrid automatic repeat request (HARQ) feedback to the second wireless device, such that the determined transmission time depends on which subset of symbols within the predetermined subframe interval was used for the first data transmission, wherein determining the transmission time comprises retrieving an offset value from a lookup table indexed by an allocation index corresponding to at least the duration of the first data transmission, and identifying the transmission time based on the retrieved offset value and a timing of the first data transmission; and
   transmitting HARQ feedback for the first data transmission at the determined transmission time.

2. The method of claim 1, wherein determining the transmission time for transmitting HARQ feedback to the second wireless device comprises determining the transmission time based on the duration of the first data transmission or a timing of the first data transmission within the predetermined subframe interval, or both.

3. The method of claim 1, wherein the length of the predetermined subframe interval is 1 millisecond and consists of 14 orthogonal frequency-division multiplexing (OFDM) symbols.

4. The method of claim 1, wherein the determined transmission time is based on the duration of the first data transmission and a position, within the predetermined subframe interval, of a last symbol of the first data transmission.

5. The method of claim 1, wherein the predetermined subframe interval has a first slot and a second slot, the first data transmission is received entirely within either the first slot or the second slot, and the determined transmission time depends on whether the first data transmission is received in the first slot or the second slot.

6. The method of claim 1, wherein the determined transmission time further depends on a transport block size for the first data transmission.

7. The method of claim 1, wherein the determined transmission time further depends on a number of spatially multiplexed layers for the first data transmission, or a timing advance value, or both.

8. The method of claim 1, wherein transmitting HARQ feedback for the first data transmission at the determined transmission time comprises bundling the HARQ feedback for the first data transmission with additional HARQ feedback for an additional data transmission received by the first wireless device in an interval different from the interval in which the first data transmission is received.

9. A method, in a first wireless device, the method comprising:
   transmitting a first data transmission to a second wireless device, wherein the first data transmission is transmitted during a predetermined subframe interval and within a duration that is less than a maximum data transmission duration that is possible within the predetermined subframe interval;
   determining a reception time for receiving hybrid automatic repeat request (HARQ) feedback from the second wireless device, such that the determined reception time depends on which subset of symbols within the predetermined subframe interval was used for the first data transmission, wherein determining the reception time comprises retrieving an offset value from a lookup table indexed by an allocation index corresponding to at least the duration of the first data transmission, and identifying the reception time based on the retrieved offset value and a timing of the first data transmission; and
   receiving HARQ feedback for the first data transmission at the determined reception time.

10. The method of claim 9, wherein determining the reception time for receiving HARQ feedback from the second wireless device comprises determining the reception time based on the duration of the first data transmission or a timing of the first data transmission within the predetermined subframe interval, or both.

11. The method of claim 9, wherein the length of the predetermined subframe interval is 1 millisecond and consists of 14 orthogonal frequency-division multiplexing (OFDM) symbols.

12. The method of claim 9, wherein the determined reception time is based on the duration of the first data transmission and a position, within the predetermined subframe interval, of a last symbol of the first data transmission.

13. The method of claim 9, wherein the predetermined subframe interval has a first slot and a second slot, the first data transmission is transmitted entirely within either the first slot or the second slot, and the determined reception time depends on whether the first data transmission is transmitted in the first slot or the second slot.

14. The method of claim 9, wherein the determined reception time further depends on a transport block size for the first data transmission.

15. The method of claim 9, wherein the determined reception time further depends on a number of spatially multiplexed layers for the first data transmission, or a timing advance value, or both.

16. The method of claim 9, further comprising receiving additional HARQ feedback for an additional data transmission transmitted to the second wireless device in an interval different from the interval in which the first data transmission is transmitted, the additional HARQ feedback being bundled with the HARQ feedback for the first data transmission.

17. A method, in a first wireless device, the method comprising:
   receiving a first data transmission from a second wireless device, wherein the first data transmission is received during a predetermined subframe interval, and wherein said receiving comprises decoding fewer than all of a scheduled number of symbols in the first data transmission;
   determining a transmission time for transmitting hybrid automatic repeat request (HARQ) feedback to the second wireless device, such that the determined transmission time depends on which subset of symbols within the predetermined subframe interval was used in said decoding, wherein determining the transmission time comprises retrieving an offset value from a lookup table indexed by an allocation index corresponding to at least the duration of the first data transmission, and identifying the transmission time based on the retrieved offset value and a timing of the first data transmission; and
   transmitting HARQ feedback for the first data transmission at the determined transmission time.

18. The method of claim 17, wherein the determined transmission time depends on the position of the last symbol used in said decoding.

19. A method, in a first wireless device, the method comprising:
   transmitting a first data transmission to a second wireless device, wherein the first data transmission is transmitted during a predetermined subframe interval;
   determining a reception time for receiving hybrid automatic repeat request (HARQ) feedback from the second wireless device, such that the determined reception time depends on which subset of symbols within the predetermined subframe interval was used by the second wireless device for decoding the first data transmission, wherein determining the reception time comprises retrieving an offset value from a lookup table indexed by an allocation index corresponding to at least the duration of the first data transmission, and identifying the reception time based on the retrieved offset value and a timing of the first data transmission; and
   receiving HARQ feedback for the first data transmission at the determined reception time.

20. The method of claim 19, wherein the determined reception time depends on the position of the last symbol used by the second wireless device in decoding the first data transmission.

21. An apparatus comprising:
   a transceiver circuit, and
   a processing circuit,
   wherein the processing circuit is configured to control the transceiver circuit and to:
   receive a first data transmission from a second wireless device, via the transceiver circuit, wherein the first data transmission is received during a predetermined subframe interval and within a duration that is less than a maximum data transmission duration that is possible within the predetermined subframe interval;
   determine a transmission time for transmitting hybrid automatic repeat request (HARQ) feedback to the second wireless device, such that the determined transmission time depends on which subset of symbols within the predetermined subframe interval was used for the first data transmission, wherein the processing circuit is configured to determine the transmission time by retrieving an offset value from a lookup table indexed by an allocation index corresponding to at least the duration of the first data transmission and identifying the transmission time based on the retrieved offset value and a timing of the first data transmission; and
   transmit HARQ feedback for the first data transmission at the determined transmission time, via the transceiver circuit.

22. The apparatus of claim 21, wherein the apparatus is a base station.

23. The apparatus of claim 21, wherein the apparatus is a user equipment.

24. An apparatus comprising:
   a transceiver circuit, and
   a processing circuit,
   wherein the processing circuit is configured to control the transceiver circuit and to:
   transmit a first data transmission to a second wireless device, via the transceiver circuit, wherein the first data transmission is transmitted during a predetermined subframe interval and within a duration that is less than a maximum data transmission duration that is possible within the predetermined subframe interval;
   determine a reception time for receiving hybrid automatic repeat request (HARQ) feedback from the second wireless device, such that the determined reception time depends on which subset of symbols within the predetermined subframe interval was used for the first data transmission, wherein the processing circuitry is configured to determine the reception time by retrieving an offset value from a lookup table indexed by an allocation index corresponding to at least the duration of the first data transmission and identifying the reception time based on the retrieved offset value and a timing of the first data transmission; and
   receive HARQ feedback for the first data transmission at the determined reception time, via the transceiver circuit.

* * * * *